(12) United States Patent
Sumiyoshi

(10) Patent No.: US 7,097,316 B2
(45) Date of Patent: Aug. 29, 2006

(54) DISPLAY UNIT FOR VEHICLE

(75) Inventor: Kenjirou Sumiyoshi, Tokyo (JP)

(73) Assignee: Calsonic Kansei Corporation, Tokyo (JP)

( * ) Notice: Subject to any disclaimer, the term of this patent is extended or adjusted under 35 U.S.C. 154(b) by 112 days.

(21) Appl. No.: 10/928,870

(22) Filed: Aug. 26, 2004

(65) Prior Publication Data

US 2005/0146885 A1    Jul. 7, 2005

(30) Foreign Application Priority Data

| Aug. 29, 2003 | (JP) | ............................. 2003-306728 |
| Sep. 8, 2003 | (JP) | ............................. 2003-315150 |
| Sep. 24, 2003 | (JP) | ............................. 2003-330900 |
| Sep. 25, 2003 | (JP) | ............................. 2003-333697 |
| Jan. 20, 2004 | (JP) | ............................. 2004-011708 |
| Jan. 20, 2004 | (JP) | ............................. 2004-011724 |

(51) Int. Cl.
*G01D 13/28* (2006.01)

(52) U.S. Cl. ............................. 362/28; 362/29; 362/30; 362/553; 362/560; 362/487; 362/488; 362/489; 116/286; 116/246; 116/257

(58) Field of Classification Search .................. 362/28, 362/29, 30, 553, 560, 487–489; 116/286, 116/246, 257
See application file for complete search history.

(56) References Cited

U.S. PATENT DOCUMENTS 6,456,260 B1 * 9/2002 Koenig et al. .................. 345/7

6,786,524 B1 * 9/2004 Tamura .................... 296/37.12

FOREIGN PATENT DOCUMENTS

| DE | 19529390 | * | 2/1997 |
| JP | 5-17619 | | 5/1993 |
| JP | 08-080762 | | 3/1996 |
| JP | 08080728 A | * | 3/1996 |
| JP | 08-193852 | | 7/1996 |
| JP | 11034652 A | * | 2/1999 |
| JP | 11-255000 | | 9/1999 |
| JP | 2000-264095 | | 9/2000 |

* cited by examiner

*Primary Examiner*—Renee Luebke
*Assistant Examiner*—Mary Zettl
(74) *Attorney, Agent, or Firm*—J.C. Patents

(57) ABSTRACT

A display for a vehicle, including a light source, an optical device to guide light from the light source and form the light from the light source into a light pointer, a head portion disposed above a meter surface to project the light pointer formed by the optical device on the meter surface from above of the meter surface, a driving device to rotate the head portion, and a height adjusting mechanism to adjust a height of the head portion to the meter surface to be capable of changing a length of the light pointer while projecting the light pointer.

20 Claims, 26 Drawing Sheets

Length of pointer vs Angle

Height of pointer vs Angle

DISPLAY UNIT FOR VEHICLE

CROSS REFERENCE TO THE RELATED APPLICATION

The application claims the priority benefit of Japanese Patent Application Nos. 2003-306728 filed on Aug. 29, 2003, 2003-315150 filed on Sep. 8, 2003, 2003-330900 filed on Sep. 24, 2003, 2003-333697 filed on Sep. 25, 2003, 2004-011708 filed on Jan. 20, 2004, and 2004-011724 filed on Jan. 20, 2004, the entire descriptions of which are incorporated herein by reference.

BACKGROUND OF THE INVENTION

1. Field of the Invention

The present invention relates to an improvement in a display unit for a vehicle, adapted to project a light pointer on a surface of a meter.

2. Description of the Related Art

Generally, a display for a vehicle such as a meter is provided on a front part of a room of a vehicle such as an automobile. There have been known various display units for the vehicle. Above all, an analog type meter in which a pointer is rotated along a pointer rotating area formed on a surface of the meter is usual.

A structure including a meter surface having a scale and a light pointer projected on a pointer rotating area of the meter surface and formed by line-shaped laser beam is known as the analog type meter, as disclosed in Japanese Patent Laid-Open H08-193852, for reference.

However, because the light pointer is adapted to carry out a circular movement about a base of the pointer in the conventional analog type meter, the pointer rotating area of the meter surface to which the light pointer is projected must be formed into a circular shape. If the meter surface is formed into a non circular shape such as an ellipse, the light pointer projected in the circular shape does not correspond to the non-circular meter surface, and therefore there is a fear that it is difficult to judge what scale the light pointer indicates.

From the circumstances, there is a problem that the meter surface or the pointer rotating area must be limited to the circular shape, and it is not possible to form the meter surface and so on in any shape such as the ellipse.

Moreover, as another example using the light pointer, there is known a display for a vehicle disclosed in Japanese Utility Model H 5-17619.

However, in the display for the vehicle as described in the document because a variety of optical parts for generating a light pointer are disposed to disperse in a meter displaying device, there is a problem that the display has a disorganized structure.

Moreover, in the display for the vehicle, because the pointer has a short bar-like shape, it is necessary to provide an indicator displaying part on a position out of the pointer rotating area of the meter surface so that the indicator displaying part is not obscured by means of the pointer. Accordingly, the meter surface must have separately the pointer rotating area and a displaying portion of the indicator displaying part, therefore there is a problem that the meter surface become large in size and the miniaturization is not achieved and further a limitation is generated on a design.

In vehicles such as automobiles, an instrument panel provided on a front portion of a room is provided with a storage device for a vehicle such as a glove box disposed in a front of a passenger seat, usually, (for reference, see Japanese Patent Laid-Open H 11-255000). A meter device is also provided in a front of a driver seat.

However, in the storage device described in the patent document, because the storage device such as the glove box and the meter device are attached separately to the instrument panel, there is a problem that space efficiency is not effect.

Moreover, in vehicles such as automobiles, usually, a display for a vehicle such as a meter is provided on an instrument panel and air blowout openings as in a ventilator grill or diffusing-gill are provided in positions out of the meter (for reference, see Japanese Patent Laid-Open 2000-264095).

However, in such a structure, because the meter and air blowout openings are formed by separate parts and disposed at different positions, increment of number of parts, increment of an installation space and a limitation of the instrument panel on a design by the increment of the parts and so on, have been generated.

Furthermore, there is known a conventional instrument panel structure for a vehicle, in which an opened air duct is provided in a rear surface of an instrument panel and a part of the instrument panel is used as an upper lid of the opened air duct (for reference, see Japanese Patent Laid-Open H 08-080762).

However, in the instrument panel structure for the vehicle, because the one portion of the instrument panel is merely used as the upper lid of the air duct, there is a problem that the air duct and so on cannot be still eliminated and a space efficiency within the instrument panel cannot be enhanced.

SUMMARY OF THE INVENTION

To solve the above-mentioned problems, a first object of the present invention is to provide a display for a vehicle capable of corresponding to a non-circular meter surface by changing a length of a light pointer, during projecting the light pointer.

A second object of the present invention is to provide a display for a vehicle having a compact structure.

A third object of the present invention is to provide a display for a vehicle of providing a particulate function and design by structuring a discontinuously formed pointer.

A fourth object of the present invention is to provide a storage device for a vehicle in which a meter device is attached on a surface of a body of the storage device.

A fifth object of the present invention is to provide a display for a vehicle comprising a pointer rotating area at a periphery thereof a character-scale part, and a pointer having a rotational center inside of the pointer rotating area, an air-blowing opening being provided inside of the pointer rotating area.

A sixth object of the present invention is to provide a display for a vehicle in which an air header is provided on an instrument panel, a plurality of air-blowing openings are formed throughout the entire area of a surface of the instrument panel, and a pointer is projected on the instrument panel.

To attain the first object, a display unit for a vehicle according to the present invention comprises a light source, an optical device to guide light from the light source and form the light from the light source into a light pointer, a head portion disposed above a meter surface to project the light pointer formed by the optical device on the meter surface from above of the meter surface, a driving device to rotate the head portion, and a height adjusting mechanism to adjust a height of the head portion to the meter surface to be capable of changing a length of the light pointer during projecting the light pointer.

To attain the second object, a display unit for a vehicle according to the present invention comprises a laser source as a point source capable of generating a laser beam, an aspheric lens to focus the laser beam from the laser source, a conversion lens to convert linearly the laser beam focused by the aspheric lens, and a mirror to change a direction of the laser beam linearly converted by the conversion lens and to project it on a meter surface.

The laser source, the aspheric lens, the conversion lens, and the mirror are arranged in a straight line and contained in a casing to form a shaft for a light pointer, which is disposed passing through the meter surface to rotate relative to the meter surface.

To attain the third object, a display unit for a vehicle according to the present invention comprises a light source, an optical device to guide light from the light source and form the light from the light source into a light pointer, a head portion disposed above a meter surface to project the light pointer formed by the optical device on the meter surface from above of the meter surface, a driving device to rotate the head portion, and a mechanism for forming a discontinuous part on the light pointer.

To attain the fourth object, a storage device for a vehicle according to the present invention comprises a body of the storage device, and a display unit for the vehicle provided on a surface of the body.

The display unit for the vehicle includes a light source, an optical device to guide light from the light source and form the light from the light source into a light pointer, a head portion disposed above a meter surface to project the light pointer formed by the optical device on the meter surface from above of the meter surface, and a driving device to rotate the head portion.

To attain the fifth object, a display unit for a vehicle according to the present invention comprises a meter surface having a character-scale part provided on an outer peripheral portion of the meter surface, and a light pointer projected on the meter surface. An air-blowing opening is provided inside the meter surface.

To attain the sixth object, a display unit for a vehicle according to the present invention comprises an instrument panel having a surface, a plurality of air-blowing openings provided in said surface of the instrument panel, and a meter device provided on the instrument panel.

DETAILED DESCRIPTION OF THE PREFERRED EMBODIMENTS

Several embodiments of the present invention will be explained with reference to the accompanying drawings hereinafter.

FIGS. 1 to 6 illustrate a first embodiment of a display unit 2 for a vehicle to accomplish a first object of the present invention.

The display unit 2 is provided on an instrument panel 1 disposed in a front part in a room of the vehicle, such as an automobile. Here, the instrument panel 1 may be formed from a hard panel composed of a core material only or a soft panel having a foam material provided between the core material and a skin. Although there are various instrument panels, that are formed by a powder slash or powder forming or multi-layer laminates are attached to the core material and so on, other than the above, each instrument panel may be used.

In the illustrated embodiment, although the display unit 2 is disposed in a central portion of a width of the instrument panel 1, it may be provided on a side of a driver seat.

Figure 1:
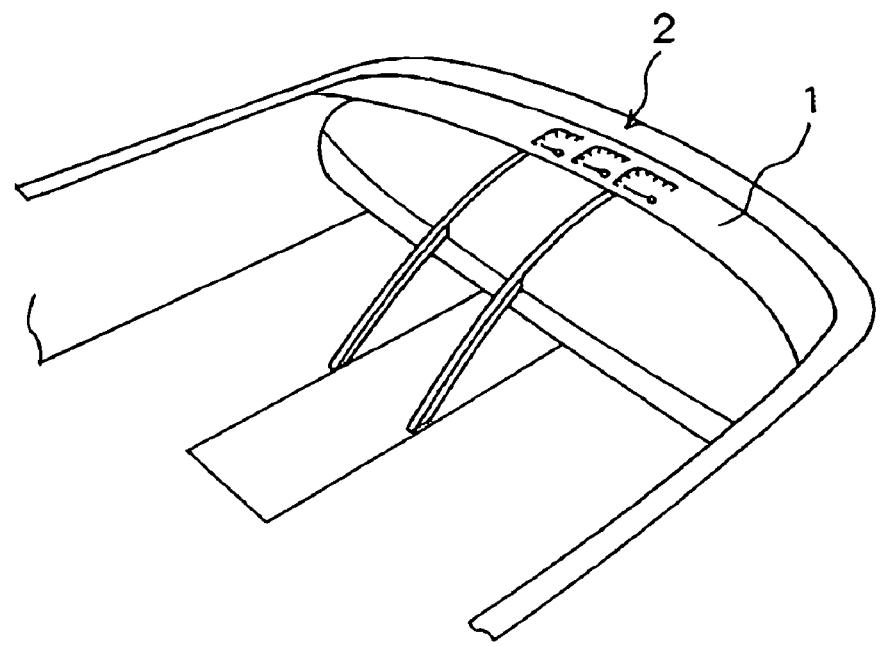
FIG. 1 is a perspective view showing an instrument panel in a first embodiment of a display unit for a vehicle to achieve a first object of the present invention.
Figure 2:
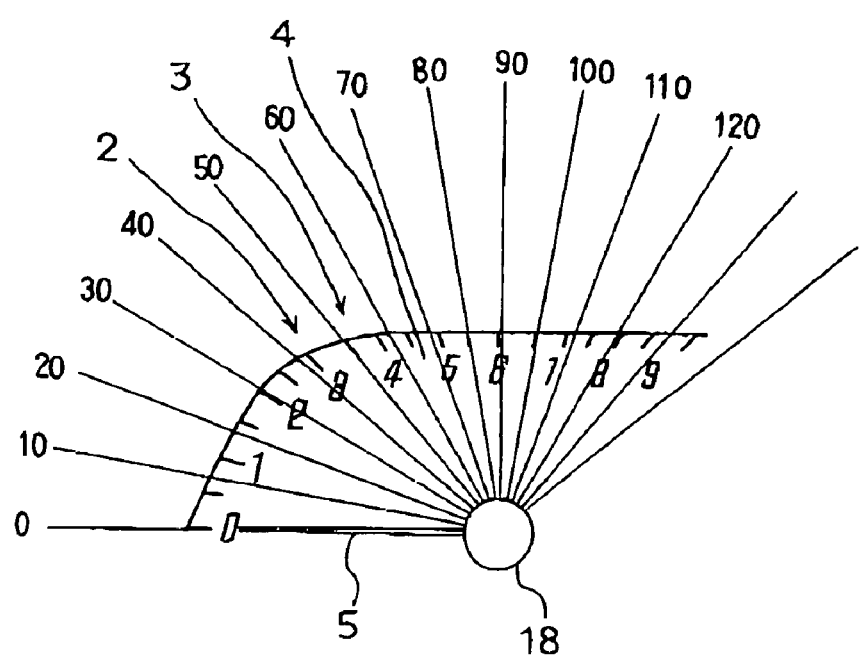
FIG. 2 is an enlarged first view of a meter part in the embodiment shown in FIG. 1.

The display unit 2 is formed into an analogue type meter in which a pointer 5 is rotated along a pointer rotating area 4 formed on a meter surface 3, as shown in FIG. 2. Meanwhile, a surface of the instrument panel 1 is employed directly as the meter surface 3, as shown in FIGS. 1 and 2. However, it is not required necessarily that the instrument panel is used as the meter surface 3.

There are known analogue type meters structured by a substantive pointer or a linear light pointer 5 formed by a laser beam, for example. In the embodiment, the linear light pointer 5 is used for the display unit 2.

Figure 3:
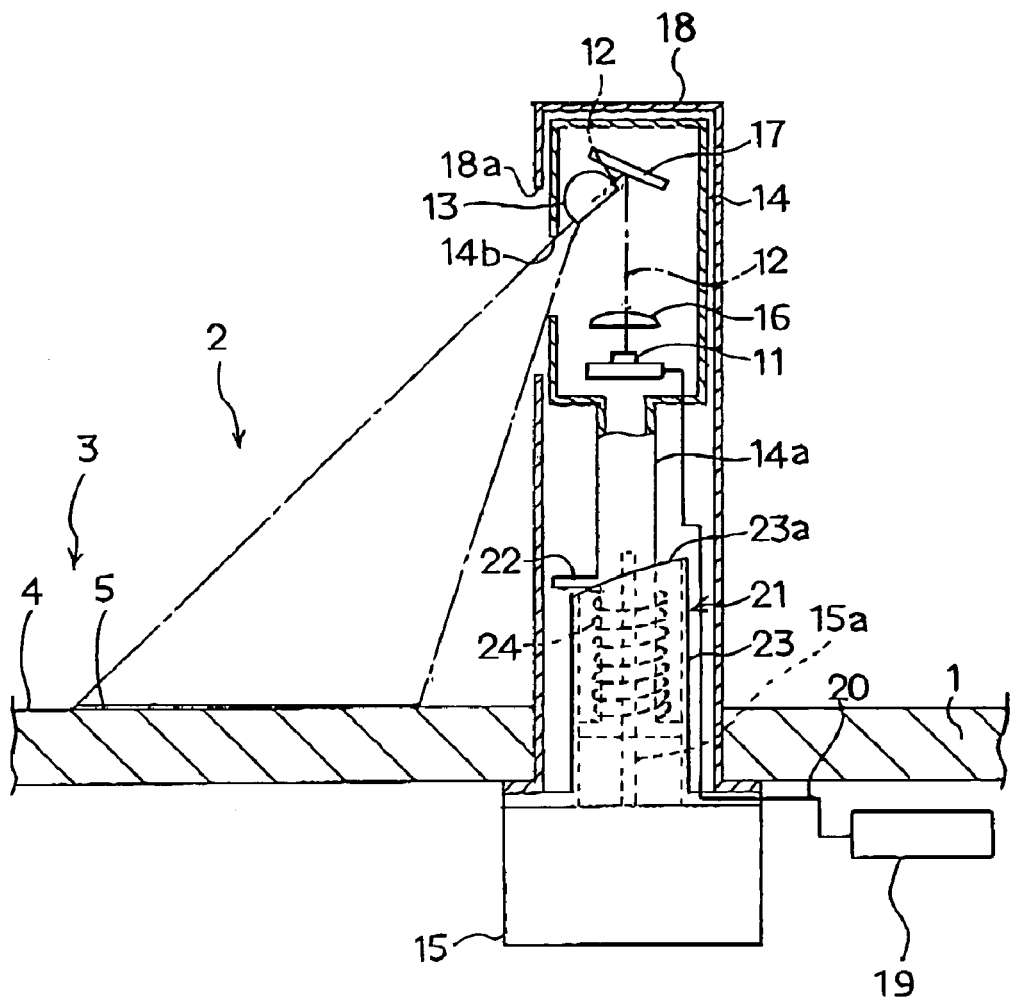
FIG. 3 is a sectional side view of a pointer shaft shown in FIG. 2.

As shown in FIG. 3, the display unit 2 comprises a laser source 11, which substantially corresponds to a point source, an optical device to guide light, or a laser beam 12 from the laser source 11 and form the laser beam from the laser source 11 into the linear light pointer 5, a head portion 14 disposed above the meter surface 3 to project the light pointer 5 formed by the optical device on the meter surface 3 from above of the meter surface 3, and a driving device 15 to rotate the head portion 14. The optical device includes a cylindrical lens 13 for converting linearly the laser beam 12 from the laser source 11. For example, a laser diode is used for the laser source 11. The driving device 15 is disposed in a rear surface of the meter surface 3. The driving device 15 includes, for example, a crossing-coil type movement, a stepping motor and so on. The head portion 14 is connected with an output shaft 15a of the diving device 15, as described below.

If necessary, supplementary optical parts of an aspheric lens 16 for collecting light, a mirror 17 for illuminating the laser beam 12 on the meter surface 3 by changing a direction thereof, and so on may be provided in an optical path of the laser beam 12. A cylindrical central rotating shaft 14a is provided on the head portion 14 to project from an end thereof. The output shaft 15a of the driving device 15 is splined in the central rotating shaft 14a so that the output shaft 15a and the central rotating shaft 14a are rotated integrally and moved slidably with respect to each other in an axial direction. The head portion 14 and central rotating shaft 14a are covered by means of a protecting cover 18. The protecting cover 18 is provided with a light emitting window 18a formed throughout the pointer rotating area of the pointer 5. A transparent window member for protection may be provided in the light emitting window 18a.

The protecting cover 18 constitutes a pointer shaft and forms a design of pointer shaft. The protecting cover 18 extends generally perpendicularly to the meter surface 3 through a hole for the pointer shaft, which is formed in the meter surface 3 of the instrument panel 1. A basic portion of the protecting cover 18 is fixed to the driving device 15. A laser driving circuit 19 is connected with the laser source 11. The laser driving circuit 19 is disposed in a suitable position on a rear surface of the instrument panel 1. The laser driving circuit 19 may be fixed directly on the rear surface of the instrument panel 1 or fixed on a structural member, a substrate or the like (not shown) disposed on the rear surface of the instrument panel 1. A wiring part 20 connecting the laser source 11 and the laser driving circuit 19 is also covered by means of the protecting cover 18. The wiring part 20 has a desired length.

Figure 4:
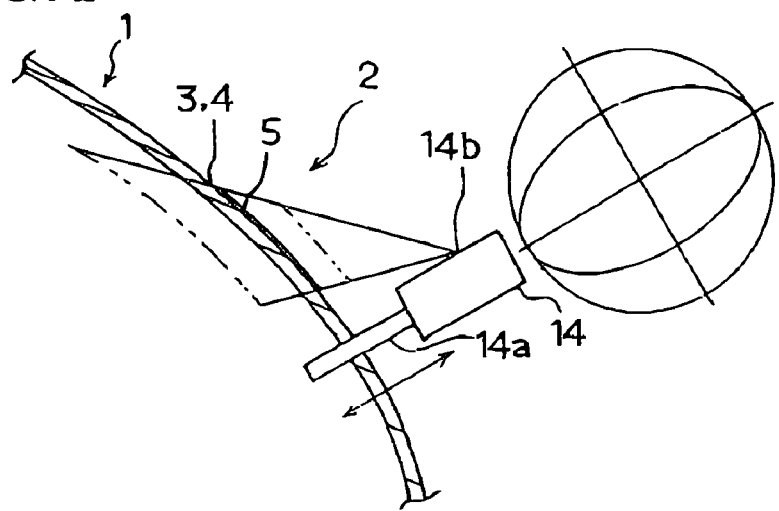
FIG. 4 is a partially sectioned side view of FIG. 2.

In the first embodiment, a length of the light pointer 5 in the display unit 2 is configured to be changeable. That is to say, as shown in FIG. 4, the length of the light pointer 5 can be changed by permitting a height of a projecting portion 14b for emitting the laser beam provided in the head portion 14 to adjust relative to the meter surface 3 during displaying the light pointer on the meter surface. In addition, a transparent window member for protection may be provided in the projecting portion 14b.

More specifically, there is provided a height adjusting mechanism 21 to adjust the height of the head portion 14 relative to the meter surface 3 to be capable of changing a length of the light pointer 5 during projecting the light pointer.

The height adjusting mechanism 21 may be disposed between the head portion 14 and the driving device 15, for example, as shown in FIG. 3. In FIG. 3, the height adjusting mechanism 21 includes a guide pin 22 provided to project on a peripheral surface of the cylindrical central rotating shaft 14a to project sideward thereof, a guide cylinder 23 having a cam surface 23a to guide movably upward and downward the guide pin 22, and a sliding mechanism 24 to slide the guide pin 22 on the cam surface 23a. Here, the guide cylinder 23 is disposed concentrically within the protecting cover 18. A basic portion of the guide cylinder 23 is fixed between the basic portion of the protecting cover 18 and the driving device 15. For example, a tension spring (not shown) disposed between the cylindrical central rotating shaft 14a and the guide cylinder 23 is used for the sliding mechanism 24. Meanwhile, a position of the driving device 15 is constant.

Figure 5:
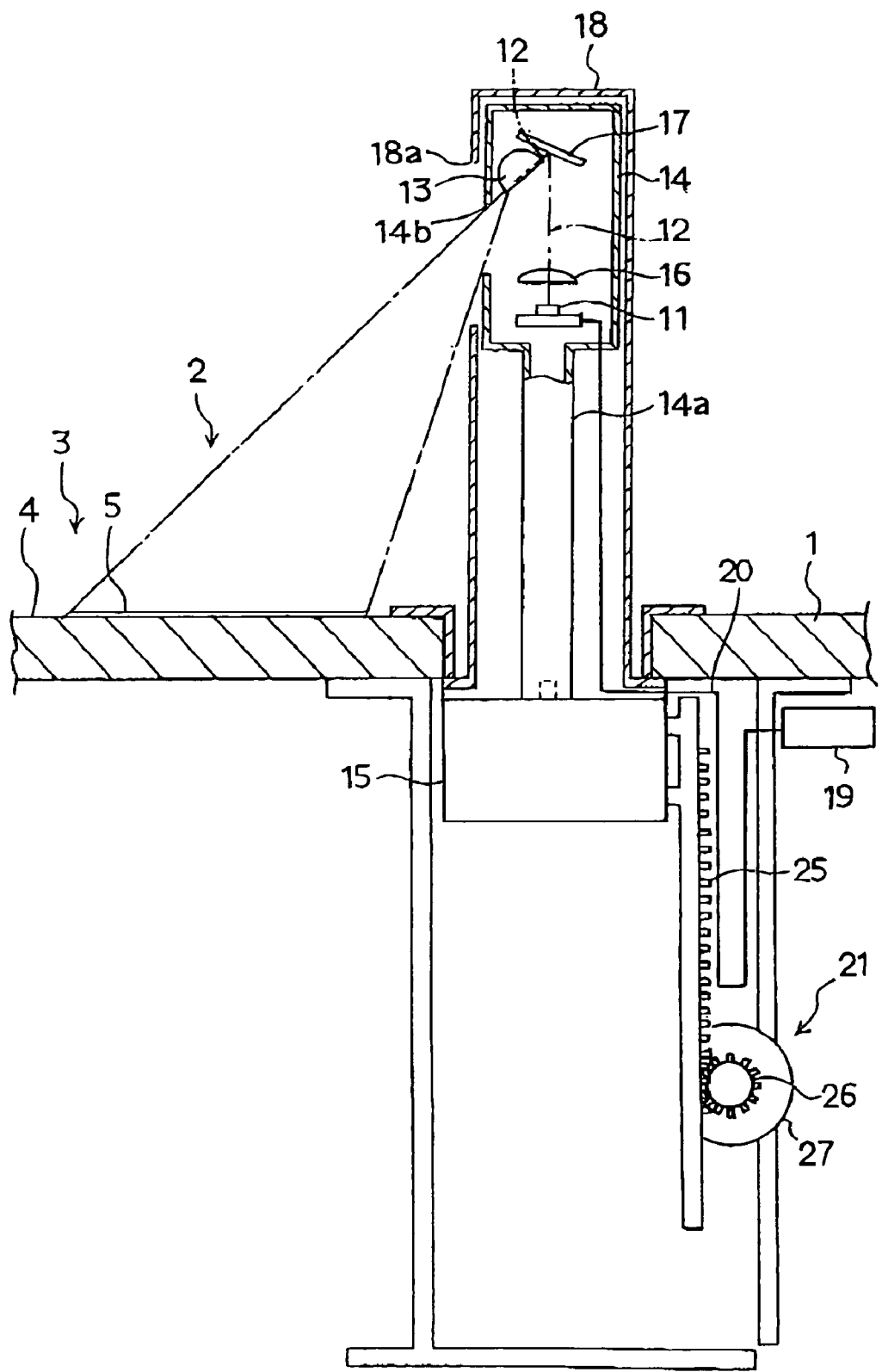
FIG. 5 is a sectional side view of the pointer shaft, with a height adjusting mechanism shown.

The height adjusting mechanism 21 may be structured to elevate the head portion 14 with the driving device 15, for example, as shown in FIG. 5. In FIG. 5, the height adjusting mechanism 21 includes a rack 25 provided on the driving device 15, a pinion 26 engaged with the rack 25, and a driving device 27 to drive the pinion 26. For example, a stepping motor or the like is used for the driving device 27. The driving device 27 is fixed to a guide frame member (not shown) or the like, disposed on the rear surface of the instrument panel 1 and attached on a periphery of the hole for the pointer shaft. Because the protecting cover 18 is also elevated with the driving device 15, a finisher (not shown) or the like may be provided in a portion of the hole for the pointer shaft in the instrument panel 1.

In accordance with the change of the length of the light pointer 5, the pointer rotating area 4 is formed into an elliptic shape, a rectangular shape or the other any noncircular shape. For example, as shown in FIG. 2, if the pointer rotating area 4 is formed into a parallelogram, a character-scale displaying part of the pointer rotating area 4 is formed into a generally U-character shape along a left part and an upper part of the parallelogram and the pointer shaft is set in the vicinity of a right and lower corner portion of the parallelogram.

Figure 6A:
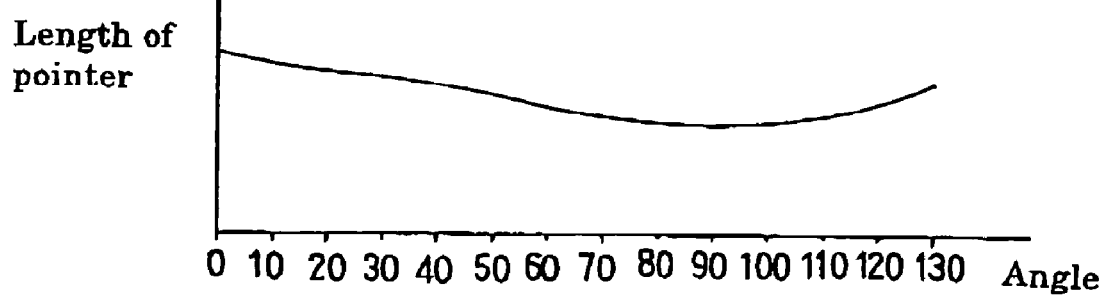
FIG. 6A is a graph showing a relationship between a length and an angle of a pointer.
Figure 6B:
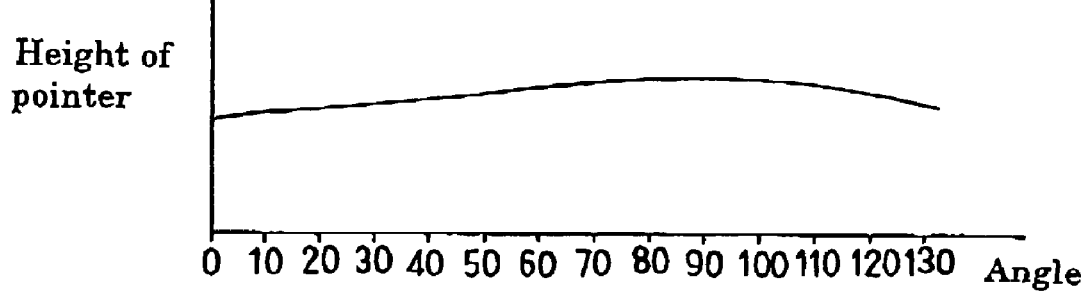
FIG. 6B is a graph showing a relationship between a height and the angle of the pointer.

Moreover, the height of the head portion 14 is adjusted in such a manner that the length of the light pointer 5 changes in accordance with a shape of the pointer rotating area 4. For example, if the character-scale displaying part is formed into the U-character shape as described in FIG. 2, the length of the light pointer 5 is changed as shown in FIG. 6A. To do so, a cam profile of the cam surface 23a in a guide mechanism in FIG. 3 may be set or the height of the pointer 5 in a rack and pinion mechanism in FIG. 5 may be set, as shown in FIG. 6B, respectively. In other words, by obtaining a length of the pointer 5 necessary every a rotational angle of the pointer 5, the cam profile may be formed corresponding to the obtained length of the pointer.

An operation of the first embodiment as described above will be explained.

The light pointer 5 is formed on the pointer rotating area 4 through projection of the linear laser beam 12 by collecting the laser beam 12 from the laser source 11 by the aspheric lens 16, changing the direction of the laser beam 12 by the mirror 17, converting the laser beam into a linear shape by a conversion lens, for example, the cylindrical lens 13 and emitting the linear laser beam from the projecting portion 14b to project on the meter surface 3.

The drive of the driving device 15 causes the head portion 14 to rotate about the output shaft 15a and the central rotating shaft 14a so that the light pointer 5 is rotated along the pointer rotating area 4.

In the first embodiment, when the head portion 14 is in a higher position, a projected range of the linear laser beam 12 enlarges so that the light pointer 5 becomes longer, when the head portion 14 is in a lower position, the projected range of the linear laser beam 12 narrows so that the light pointer 5 becomes shorter.

In this way, because the length of the pointer 5 is able to change during it rotates by adjusting the height of the projecting part 14b of the linear laser beam 12 forming the light pointer 5 relative to the meter surface 3 during the projection, the non-circular pointer rotating area 4 can be easily formed. Therefore, it is possible to very enhance a degree of design freedom to the pointer rotating area 4 to make a meter broken down an existing concept.

It is also possible to acquire a mechanism for changing the length of the pointer 5 by providing the height adjusting mechanism 21 to adjust the height of the head portion 14 relative to the meter surface 3 during displaying, in the display unit 2 including integrally the head portion 14 having at least the laser source 11 which is the point source and the cylindrical lens 13 for converting linearly the laser beam 12 from the laser source 11 and the driving device 15 for rotating the head portion 14.

It is possible to change the length of the pointer 5 by disposing the height adjusting mechanism 21 between the head portion 14 and the driving device 15. If the height adjusting mechanism 21 is structured into the guide mechanism for using the rotation of the driving device 15 as shown in FIG. 3, it is possible to perform height adjustment of the head portion 14 by a simple and inexpensive structure without providing a special driving device.

It is possible to change the length of the pointer 5 by structuring the height adjusting mechanism 21 so as to elevate the head portion 14 with the driving device 15. If the height adjusting mechanism 21 is structured into the rack and pinion mechanism as shown in FIG. 5, it is possible to achieve a more accurate height adjustment and to take largely a height adjusting allowance.

In addition, miniaturization of the head portion 14 or a laser pointer unit can be accomplished by using a laser diode as the laser source 11. Moreover, because the pointer 5 is the laser beam 12 of a lower output, if hands touch the pointer 5 there has no affection on meter function. Therefore, a cover glass at a front surface of the meter surface 3 can be omitted. Consequently, a surface of the instrument panel 1 can be formed directly as the meter surface 3 so that the meter can be integrated with an inner packing surface of the instrument panel 1 and so on, further it is possible to make a meter broken down the existing concept. On the contrary, because there is a fear that the substantive pointer is broken, the cover glass cannot be eliminated. Accordingly, the surface of the instrument panel 1 cannot be used directly as the meter surface. In this case, a character-scale displaying part of the meter may be formed in a relief on the instrument panel 1, for example, formed by painting or by a combination thereof.

FIGS. 7 to 11 illustrate a second embodiment of the present invention. In the drawings, the same numerals are attached to the similar parts as in the first embodiment.

Figure 7:
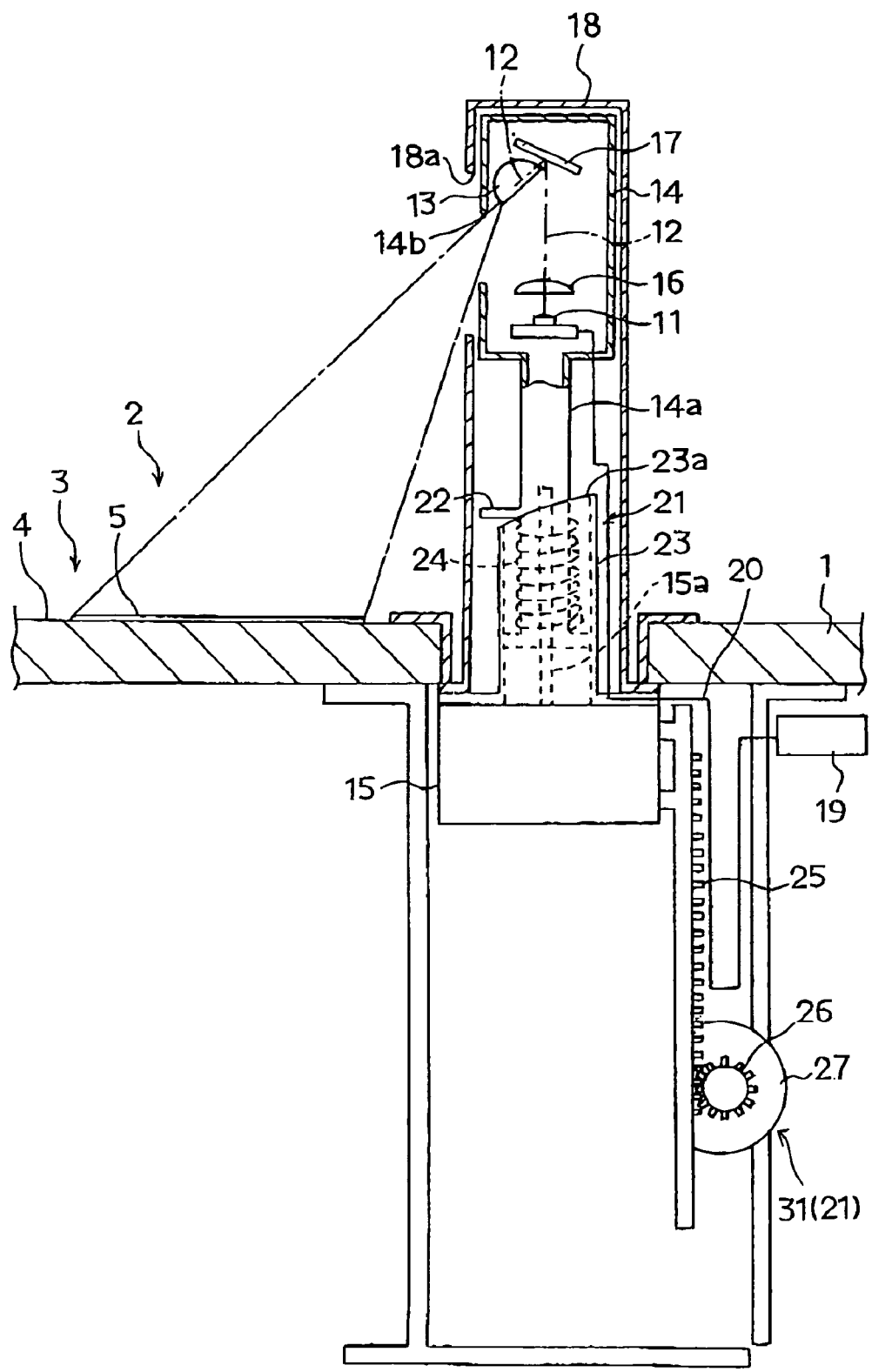
FIG. 7 is a sectional side view showing a pointer shaft in a second embodiment of the present invention.
Figure 8:
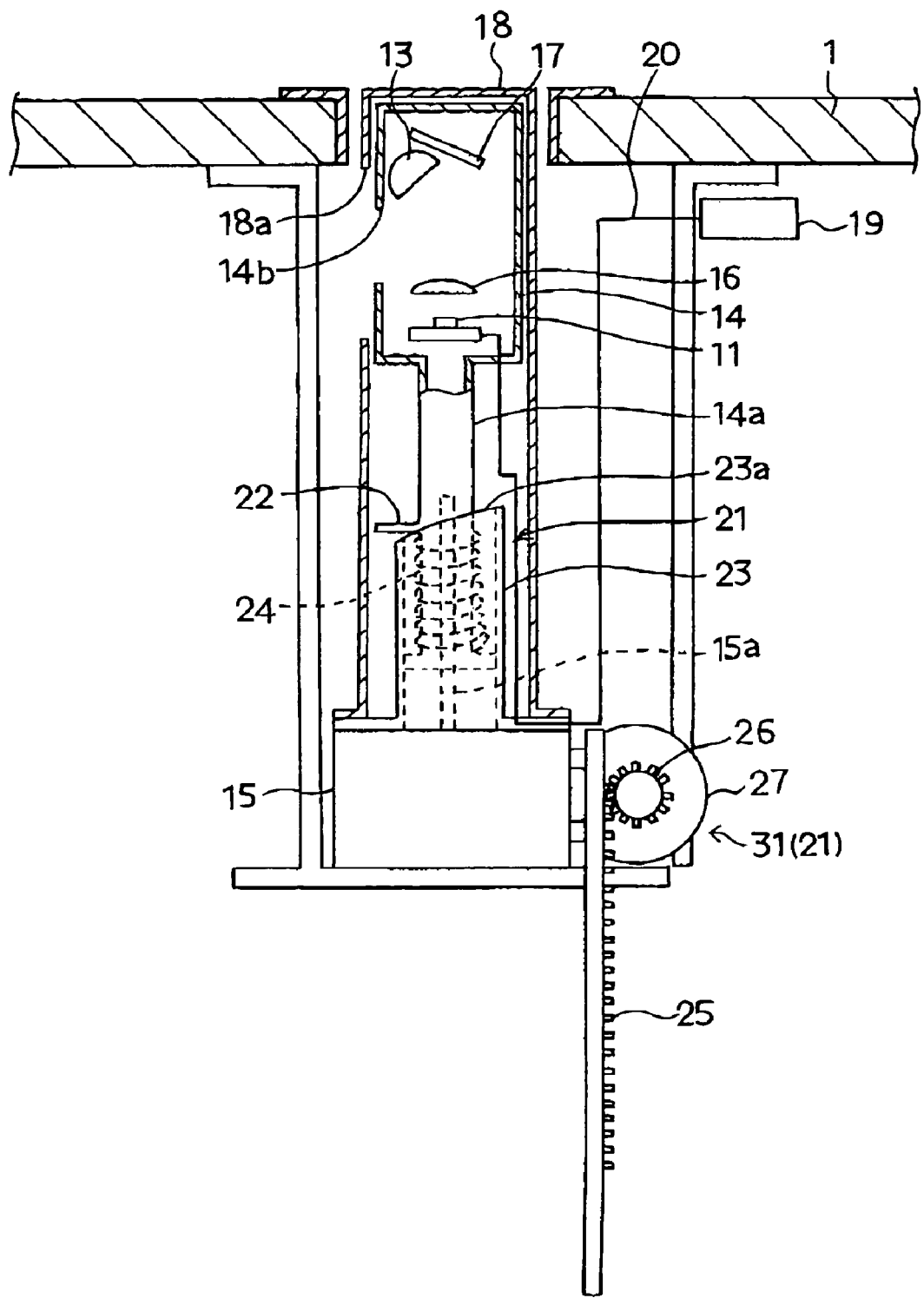
FIG. 8 is a sectional side view showing a state in which a head portion shown in FIG. 7 is contained.

The second embodiment comprises both the guide mechanism in FIG. 3 and the rack and pinion mechanism in FIG. 5, as shown in FIG. 7. The guide mechanism in FIG. 3 is used as the height adjusting mechanism 21 and the rack and pinion mechanism in FIG. 5 is adapted to use as a head storage mechanism 31 capable of containing the head portion 14 in the meter surface 3 when the meter is not used, as shown in FIG. 8. Here, the head portion 14, in other words, a top portion of the protecting cover 18 is structured so that it is contained in a generally flush state with the meter surface 3. Meanwhile, the head storage mechanism 31 may be provided separately from the height adjusting mechanism 21 as described above, however, only the rack and pinion mechanism in FIG. 5 can use together both the height adjusting mechanism 21 and the head storage mechanism 31.

When the non-using of the meter, according to a structure that the head portion 14 can be contained in the meter surface 3, the inner packaging surface of the instrument panel 1 and so on, is formed directly into the meter surface 3, similarly as in the first embodiment. At this time, the character-scale displaying part of the meter is structured so that it is displayed by illumination, for example.

Figure 9:
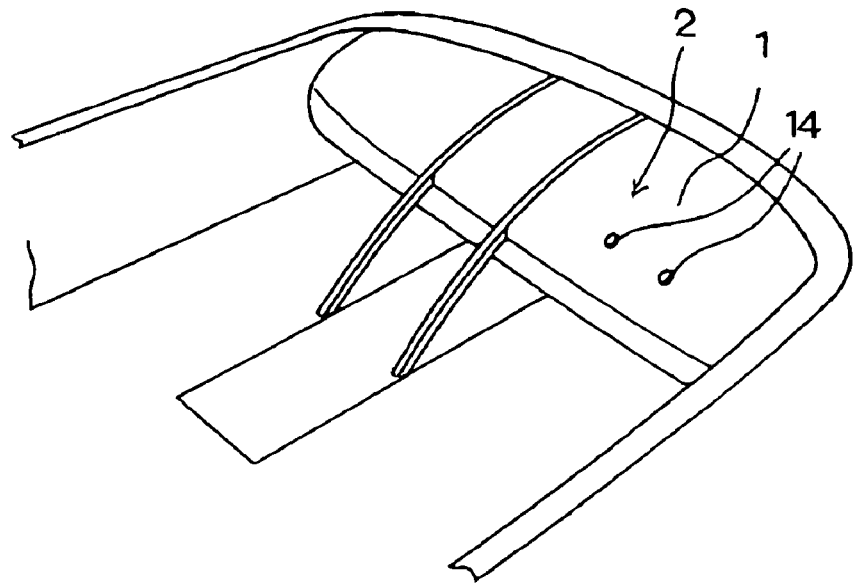
FIG. 9 is a perspective view showing the instrument panel in which the head portion is contained.
Figure 10:
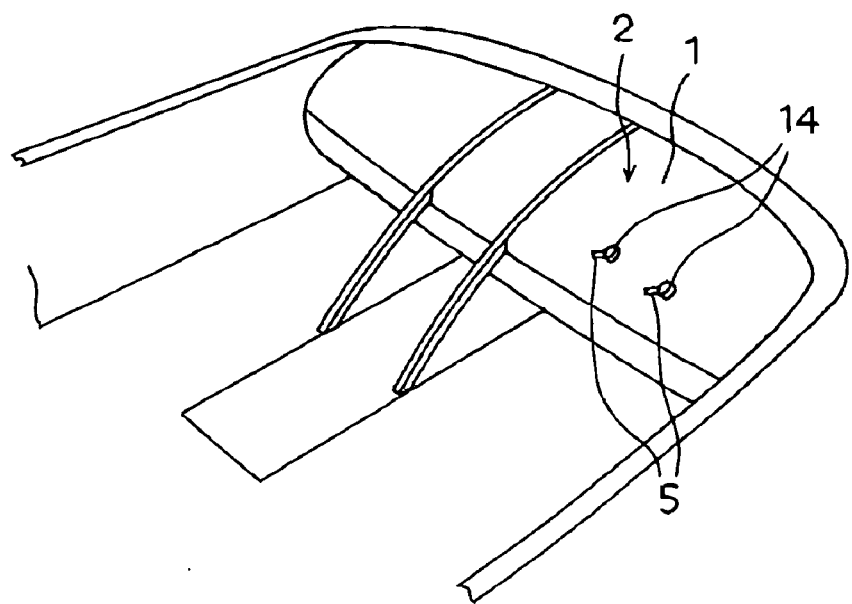
FIG. 10 is a perspective view showing the instrument panel from which the head portion is being projected.
Figure 11:
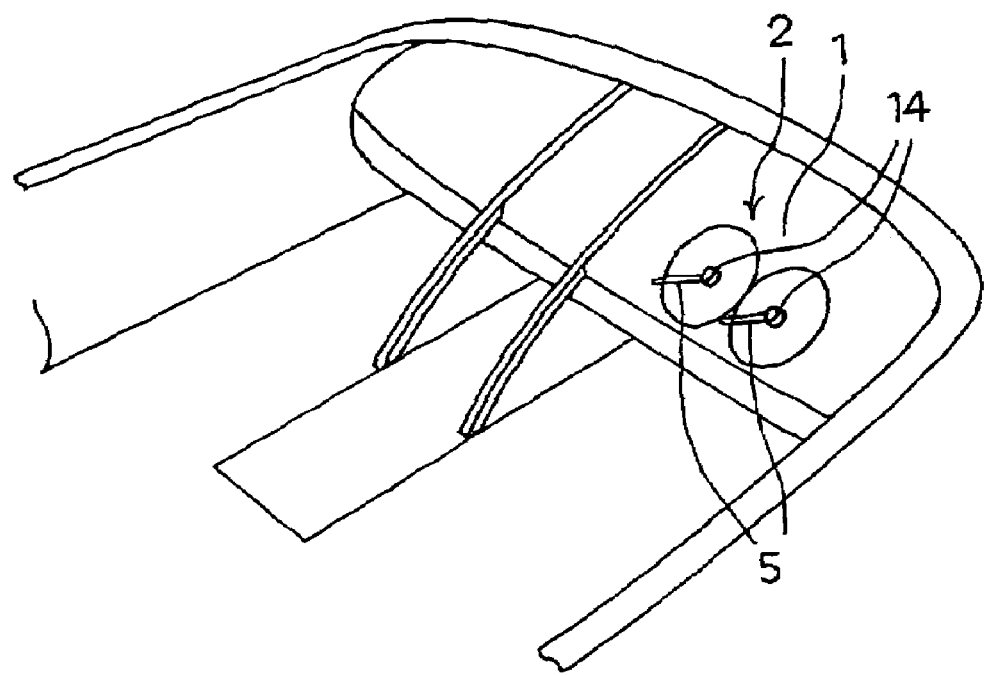
FIG. 11 is a perspective view showing the instrument panel from which the head portion is projected.

According to the second embodiment, the head portion 14 is contained in the meter surface 3 when the meter is not used, as shown in FIG. 9. At this time, because the head portion 14 is contained in approximately flush with the meter surface 3, it is possible to shield completely the meter in the meter surface when the non-using of the meter, thereby an inner packaging surface of the instrument panel 1, on which the meter is not existing, can be obtained. When the meter is used, the head portion 14 projects while extending the pointer 5 so that the character-scale displaying part is exposed by illumination, as shown in FIG. 11. Consequently, the mere inner packaging surface of the instrument panel 1 is formed into the meter surface 3, suddenly. In case of the circular pointer rotating area 4, the pointer 5 by the linear laser beam 12 is rotated under the same length. In case of the non circular pointer rotating area 4, the length of the pointer 5 is changed during the rotation thereof, similarly as in the fast embodiment, to correspond to the non-circular pointer rotating area 4. After the meter is used, the head portion 14 is again contained in the meter surface 3 and the illumination of the character-scale displaying part goes out, as a result, the inner packaging surface of the instrument panel 1 and so on, is returned to a state in which the meter surface 3 is not presented on the instrument panel.

In addition, the head portion 14 may be projected by turn on of an ignition switch and contained by turn off thereof. Moreover the head portion 14 may be projected or contained in cooperation to ranges of a shift lever. For example, the head portion may be contained by at least a P range and projected by the other ranges. Alternatively, for example, the head portion 14 is contained by means of an N range. At this time, blinking the linear laser beam 12 by the R range may cause attention to arise a driver and so on.

Furthermore, the head portion 14 may be adapted to project only when rotating the pointer 5.

The other structure and effect thereof than the above are the same as in the first embodiment.

Figure 12:
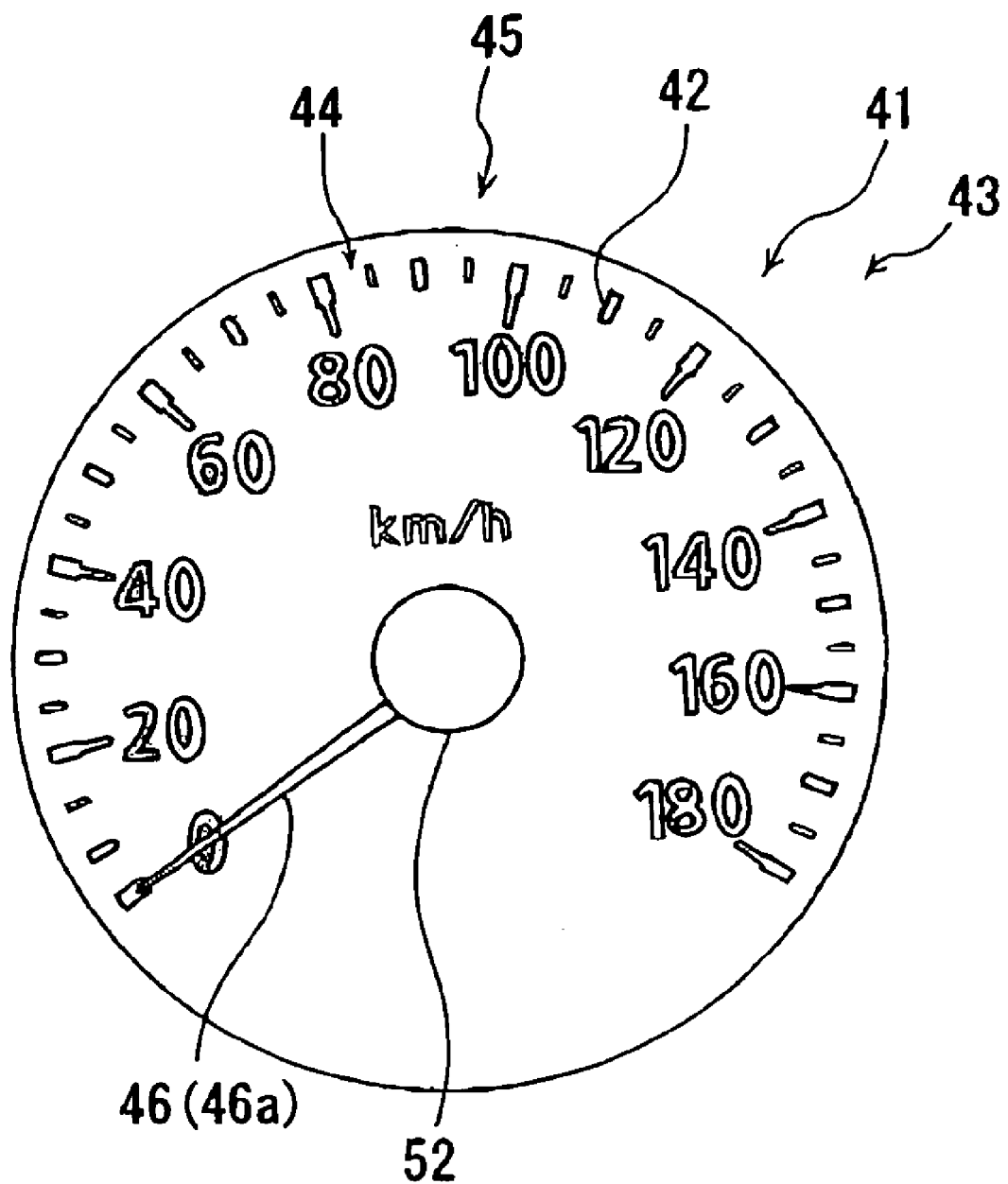
FIG. 12 is a plan view showing a meter-displaying device in a display unit for a vehicle to accomplish a second object of the present invention.

Next, an embodiment of a display unit for a vehicle to accomplish the second object of the present invention will be explained with reference to FIGS. 12 to 14.

A meter-displaying device 43 provided with a plurality of meter displaying parts 42 such as a speed meter 41 or rotating meter, which are disposed in a front portion of a room of the vehicle, is provided on the vehicle, which is, for example, an automobile. The meter-displaying device 43 is classified into an analogue type and a digital type. The analogue type meter-displaying device 43 includes a pointer rotating area 44 formed on a meter surface 45 such as a character plate and having character scales of each meter displaying part 42, and a pointer 46 disposed rotatably on the pointer rotating area 44. The pointer rotating area 44 is usually circular, the pointer 46 is disposed so that a center of the pointer rotating area 44 is a rotational central position of the pointer.

The pointer 46 includes a substantive pointer having a physical needle and a light pointer 46a having no physical needle, which is displayed only by light such as a laser beam.

In the embodiment, the displaying unit comprises a laser source 54 as a point source capable of generating a laser beam 53, an aspheric lens 55 to focus the laser beam 53 from the laser source 54, a conversion lens, for example, a cylindrical lens type 56 to convert linearly the laser beam focused by the aspheric lens 55, and a mirror 57 to change a direction of the laser beam 53 linearly converted by the cylindrical lens type 56 and to project it on the pointer rotating area 44 of the meter surface 45.

The laser source 54, the aspheric lens 55, the cylindrical lens type 56, and the mirror 57 are arranged in a straight line.

Here, for example, a laser diode is used for the laser source 54. A cylindrical lens or a rod lens is used for the cylindrical lens type 56.

On the other hand, there is provided a casing 51, which is disposed passing through the meter surface 45 of the analogue type meter-displaying device 43 to rotate relative to the meter surface 45. The optical parts as described above, the laser source 54, the aspheric lens 55, the cylindrical lens type 56, and the mirror 57 are contained and unitized in the casing 61 to form a shaft 62 for the pointer. The pointer shaft 52 acts as a device 59 for generating the light pointer. The casing 51 is disposed generally perpendicularly on the rotational central position of the pointer rotating area 44 in each meter displaying part 42 formed on the meter surface 45. In addition, the light pointer 46a is not required to form the pointer rotating area 44 into a circular shape and to set the center of the pointer rotating area 44 to the rotational central position, different from the substantive pointer. The optical parts, the laser source 54, the aspheric lens 55, the cylindrical lens type 56, and the mirror 57 are disposed to align in the straight line with respect to an axial direction 58 of the casing 51.

More specifically, although a shape and a structure of the casing 51 can be set optionally, for example, the casing 51 way be formed into a generally hollow cylinder. The casing 51 may be divided into a basic case 61 having at a front end an opening and a front case 62 having at a basic portion an opening. The basic case 61 and the front case 62 have the same diameter and are structured to adjust the openings thereof. Here, a projection part such as an exit window 63 is provided on a side surface of the front end of the front case 62. Corresponding to this, a front surface of the front case 62 is inclined at a predetermined angle so as to form an inclined end surface 62a (see FIG. 13) in order to direct light to the exit window 63.

Moreover, the laser source 54 is attached directly to a laser transmitting circuit 65 mounted on a circuit substrate (not shown), and the laser transmitting circuit 65 is contained in the basic case 61. Disposed on an upper portion of the basic case 61 is a generally cylindrical light source holder 66 capable of holding the laser source 54. On an upper portion of the light source holder 66, a generally cylindrical lens holder 67 capable of holding the aspheric lens 55 is disposed. A generally cylindrical spacer 68 is disposed on an upper portion of the lens holder 67. Disposed on an upper portion of the spacer 68 is a lens holder 69 capable of holding both ends of the cylindrical lens type 56. The mirror 57 is attached inside the inclined end surface 62a in the front case 62. The lens holder 69, the spacer 68, the lens holder 67 and the light source holder 66 are fitted into the front case 62 in turn to hold these and in this state the front case 62 and the basic case 61 are combined and unitized. Here, an outer diameter of each of the lens holder 69, the spacer 68, the lens holder 67 and the light source holder 66 is approximately the same as an inner diameter of the front case 62. The light source holder 66 is provided with a latching means 66a against the basic case 61. The latching means 66a is formed into a stepped portion engaged with an inner peripheral surface of the basic case 61.

Moreover, if necessary, the basic case 61 is contained in a protecting outer cylinder 71. A pointer cap 72 is attached detachably to the front case 62. A side surface of the pointer cap 72 is provided with an exit window 73 corresponding to the exit window 63 of the front case 62, as the projection part. A generally cylindrical protecting glass 74 is attached to an inner peripheral surface of the pointer cap 72. The protecting glass 74 has a function as a spacer disposed between the front case 62 and the pointer cap 72 and a protecting function to protect an inner portion of the casing 51 by dosing simultaneously the exit windows 63 and 73.

Meanwhile, the protect outer cylinder 71 is disposed at a back surface of the meter surface 45, the pointer cap 72 is disposed at a front surface of the meter surface 45. It is preferable from a practical standpoint that the pointer cap 72 and the protecting outer cylinder 71 are limited to be less than a size of about 10 mm in diameters.

The device 59 for generating the light pointer, structured as described above is attached to a meter-driving unit 76. A movement of a crossing coil type and a stepping motor, and so on are used for the meter-driving unit 76. The meter-driving unit 76 is adapted to attach at an axial position of the casing 51 in a basic portion of the protecting outer cylinder 71.

Reference numeral 78 denotes a cable to send a signal and a power to the laser transmitting circuit 65 and to receive them from the laser transmitting circuit 65.

Next, an operation of the above-mentioned embodiment will be explained.

The laser beam 53 is first generated from the laser source 54 as the point source by operation of the laser transmitting circuit 65. At this time, the laser beam 53 enlarging in a conical or an elliptic and conical shape at a divergence angle of about 10 degree is generated from the laser source 54. The laser beam 53 from the laser source 64 is focused by the aspheric lens 55, and the laser beam 53 focused by the aspheric lens 55 is converted linearly by the cylindrical lens type 56 to form the pointer 46, or the light pointer 46a.

Figure 13:
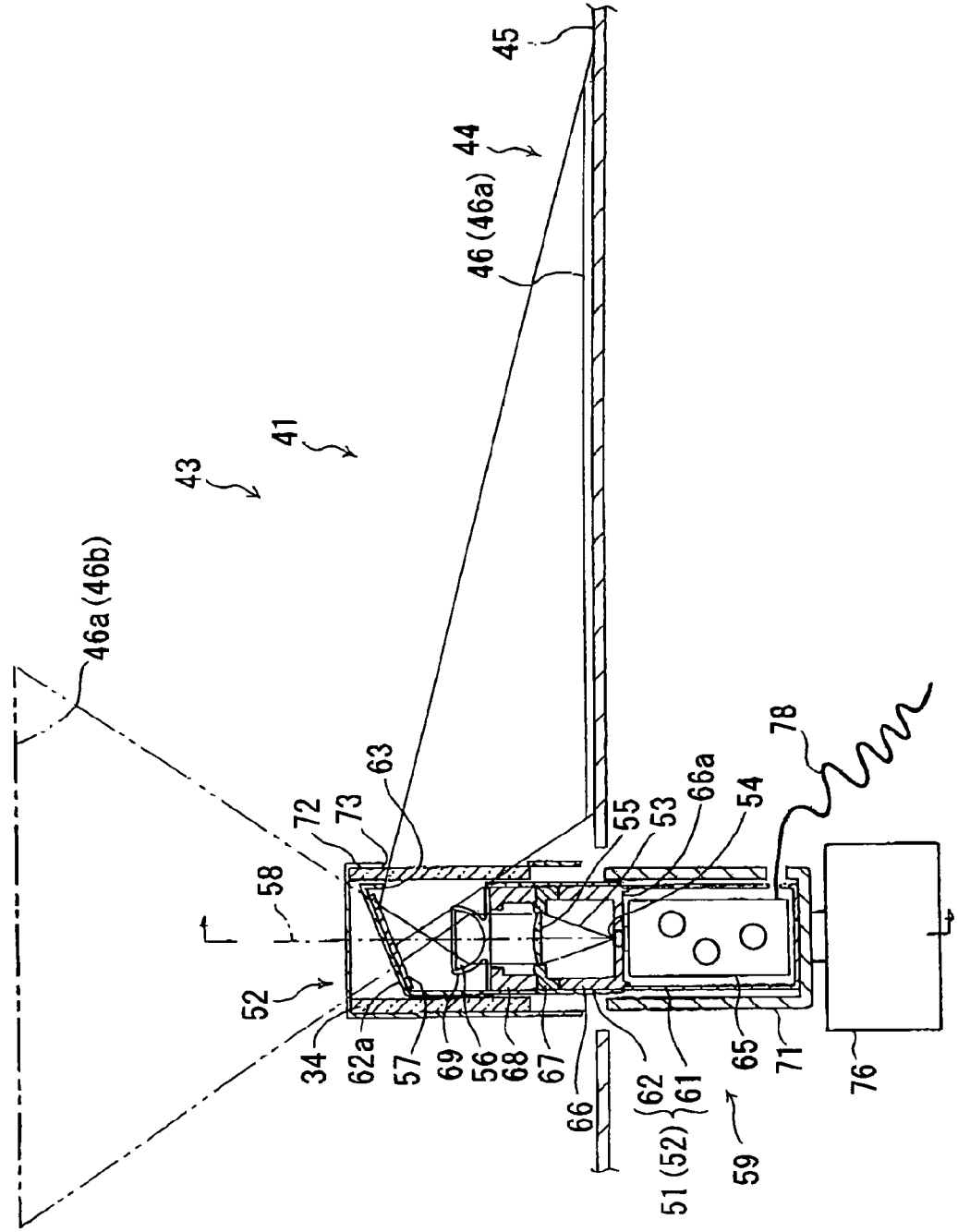
FIG. 13 is a sectional side view of the meter-displaying device shown in FIG. 12.

Because the pointer 46 is projected just above of the light pointer generating device 59, if nothing is done, as an image 46*b* of the pointer shown in FIG. 13, the projected pointer is reflected on the mirror 57 attached inside the inclined end surface 62*a* in the front case 62 to project from the exit windows 63 and 73 to the pointer rotating area 44 of the meter surface 45 of the character plate and so on. In this way, the light pointer 46*a* is formed on the pointer rotating area 4. The light pointer 46*a* is rotated along the pointer rotating area 44 by driving the meter driving unit 76 and pivoting the light pointer generating device 59 as a whole. Consequently, the pointer 46 or the light pointer 46*a* is able to indicate information such as speed information on the pointer rotating area 44.

Because the aforementioned embodiment has a structure that the laser source as the point source capable of generating the laser beam, the aspheric lens to focus the laser beam from the laser source, the conversion lens to convert linearly the laser beam focused by the aspheric lens, and the mirror to change the direction of the laser beam linearly converted by the conversion lens and to project it on the meter surface, are arranged in the straight line and contained in the casing to form the shaft for the light pointer, which is disposed passing through the meter surface to rotate relative to the meter surface, it is possible to achieve miniaturization and unitization of the display unit for the vehicle by containing compactly the optical parts of the laser source and so on in the pointer shaft 52 as described above, and to mount easily the display unit on the meter displaying device.

Subsequently, an embodiment of a display unit for a vehicle to accomplish the third object of the present invention will be explained.

Similarly as described above, a meter displaying device 83 provided with a plurality of meter displaying parts 82 such as a speed meter 80 or rotating meter 81, which are disposed in a front portion of a room of the vehicle, is provided on the vehicle, which is, for example, an automobile. The meter-displaying device 83 is classified into an analogue type and a digital type. The analogue type meter-displaying device 83 includes a pointer rotating area 84 formed on a meter surface 85 such as a character plate and having character scales of each meter displaying part 82, and a pointer 86 disposed rotatably on the pointer rotating area 84. The pointer rotating area 84 is usually circular, and the pointer 86 is disposed so that a center of the circular pointer rotating area 84 is set to a rotational central position of the pointer to rotate by a predetermined angle.

The circular meter displaying part 82 is divided into a pointer rotating area to which the pointer 86 is attached rotatably, and the remaining pointer non-rotating area 85. In the embodiment, the pointer rotating area 84 has an upper range of about 3/4 in which scales of the meter displaying part are provided, and the pointer non-rotating area 85 has a lower range of about 1/4 in which the scales are not provided.

The pointer 86 includes a substantive pointer having a physical needle and a light pointer 87 having no physical needle, which is displayed only by light such as a laser beam.

In the embodiment, the light pointer 87 is provided rotatably in the pointer rotating area 84 and a discontinuous part 88 is provided on the light pointer 87.

Therefore, a mask 90 is provided in a projection part of the light pointer 87 from a device 89 for generating the light pointer, which will be explained hereinafter, to form the discontinuous part 88.

Moreover, an indicator displaying parts 91 is provided in the pointer rotating area 84, and the indicator displaying part 91 is disposed at a position where the light pointer 87 passes through the discontinuous part 88.

In other words, conventionally, the indicator displaying part 91 is often provided on the pointer non-rotating area 85 as a whole, or a position other than the meter display part 82 of the meter surface 85, however, in the embodiment, the indicator displaying part is disposed at a position which is the generally same distance as a distance from a rotational center of the pointer 86 in the pointer rotating area 84 to the discontinuous part 88. Of course, the indicator displaying part 91 may be provided on the pointer non-rotating area 84*a* similarly as prior art. In the embodiment, the indicator displaying part 91 is disposed into a generally circular shape bridging both the pointer rotating area 84 and the pointer non-rotating area 84*a*.

The indicator displaying part 91 is structured by forming a half transparent printing layer on the meter surface 85 of the character plate or the like. In the embodiment, the half transparent printing layer of the indicator displaying part 91 is formed on a back surface of the meter surface 85 of the character plate or the like. A lamp house 93 is provided on a housing 92 of the meter-displaying device 83 disposed on the back surface of the meter surface 85 to correspond to the indicator displaying part 91. A light source 94 is disposed in the lamp house 93. It is possible to display and non-display the indicator displaying part 91 by lighting and lighting out the light source 94. Here, the indicator displaying part 91 includes various warning lamps or various information displaying lamps. As the warning lamp, for example, there are a warning lamp in wearing a seat belt, a lamp for warning a half door and so on. As the information displaying lamps, for example, there are a lamp for indicating a direction, a lamp for displaying a shift range and so on.

Meanwhile, one or more light sources 95 are also disposed on the housing 92 of the meter-displaying device 83 to illuminate the meter displaying part 82.

Subsequently, the device 89 for generating the light pointer will be explained.

There is provided a cylindrical casing 96, which is disposed pivotably passing through the meter surface 85 of the analogue type meter-displaying device 83 to rotate relative to the meter displaying part 82 on the meter surface 45. The cylindrical casing 96 constitutes a pointer shaft 97 and is disposed generally perpendicularly on a rotational center of the pointer shaft 97 in each meter displaying part 82 formed on the meter surface 85.

There are provided in the cylindrical casing 96 a laser source 100 as a point source capable of generating a laser beam 98, an aspheric lens 101 to focus the laser beam 98 from the laser source 100, a cylindrical lens type 102 to convert linearly the laser beam 98 focused by the aspheric lens 101, and a mirror 103 to change a direction of the laser beam 98 linearly converted by the cylindrical lens type 102 and to project it to the pointer rotating area 84 on the meter surface 85.

The laser source 100, the aspheric lens 101, the cylindrical lens type 102, and the mirror 103 are arranged in a straight line toward an axial direction of the casing 96, thus, the unitized light pointer-generating device 105 can be structured.

Here, for example, a laser diode is used for the laser source 100. A cylindrical lens or rod lens is used for the cylindrical lens type 102.

More specifically, the casing 96 may be divided into a basic case 106 having at a front end an opening and a front case 107 having at a basic portion an opening. The basic case 106 and the front case 107 have the same diameter and are structured to adjust the openings thereof. Here, a projection part such as an exit window 108 is provided on a side surface of the front end of the front case 107. Corresponding to this, a front surface of the front case 107 is inclined at a predetermined angle so as to form an inclined end surface 107a (see FIG. 16) in order to direct light to the exit window 108.

Moreover, the laser source 100 is attached directly to a laser transmitting circuit 109 mounted on a circuit substrate (not shown), and the laser transmitting circuit 109 is contained in the basic case 106. Disposed on an upper portion of the basic case 106 is a generally cylindrical light source holder 110 capable of holding the laser source 100. On an upper portion of the light source holder 110, a generally cylindrical lens holder 111 capable of holding the aspheric lens 101 is disposed. A generally cylindrical spacer 112 is disposed on an upper portion of the lens holder 111. Disposed on an upper portion of the spacer 112 is a lens holder 113 capable of holding both ends of the cylindrical lens type 102. The mirror 103 is attached inside the inclined end surface 107a in the front case 62. The lens holder 113, the spacer 112, the lens holder 111 and the light source holder 110 are fitted into the front case 107 in turn and the front case 107 and the basic case 106 are combined and unitized. Here, an outer diameter of each of the lens holder 113, the spacer 112, the lens holder 111 and the light source holder 110 is approximately the same as an inner diameter of the front case 107. The light source holder 110 is provided with a latching means 115 against the basic case 106. The latching means 115 is formed into a stepped portion engaged with an inner peripheral surface of the basic case 106.

Moreover, if necessary, the basic case 106 is contained in a protecting outer cylinder 116. A pointer cap 117 is attached detachably to the front case 107. A side surface of the pointer cap 117 is provided with an exit window 118 corresponding to the exit window 108 of the front case 107, as the projection part. A generally cylindrical protecting glass 119 is attached to an inner peripheral surface of the pointer cap 117. The protecting glass 119 has a function as a spacer disposed between the front case 107 and the pointer cap 117 and a protecting function to protect an inner portion of the casing 96 by closing simultaneously the exit windows 108 and 118. In the embodiment, the above-mentioned mask 90 at a corresponding portion on the protecting glass 119.

Meanwhile, the protecting outer cylinder 116 is disposed at a back surface of the meter surface 85, the pointer cap 117 is disposed at a front surface of the meter surface 85. It is preferable from a practical standpoint that the pointer cap 117 and the protecting outer cylinder 116 are limited to be less than a size of about 10 mm in diameters.

The device 105 for generating the light pointer, structured as described above is attached to a meter-driving unit 120. A crossing coil type movement, a stepping motor and so on are used for the meter-driving unit 120. The meter-driving unit 120 is adapted to attach at an axial position of a basic portion of the protecting outer cylinder 116.

Reference numeral 121 denotes a cable to send a signal and a power to the laser transmitting circuit 109 and to receive them from the laser transmitting circuit 109.

Next, an operation of the above-mentioned embodiment will be explained.

The laser beam 98 is first generated from the laser source 100 as the point source by operation of the laser transmitting circuit 109. At this time, the laser beam 98 enlarging in a conical or an elliptic and conical shape at a divergence angle of about 10 degree is generated from the laser source 100. The laser beam 98 from the laser source 100 is focused by the aspheric lens 101, and the laser beam 98 focused by the aspheric lens 101 is converted linearly by the cylindrical lens type 102 to form the pointer 86, or the light pointer 86a.

Figure 16:
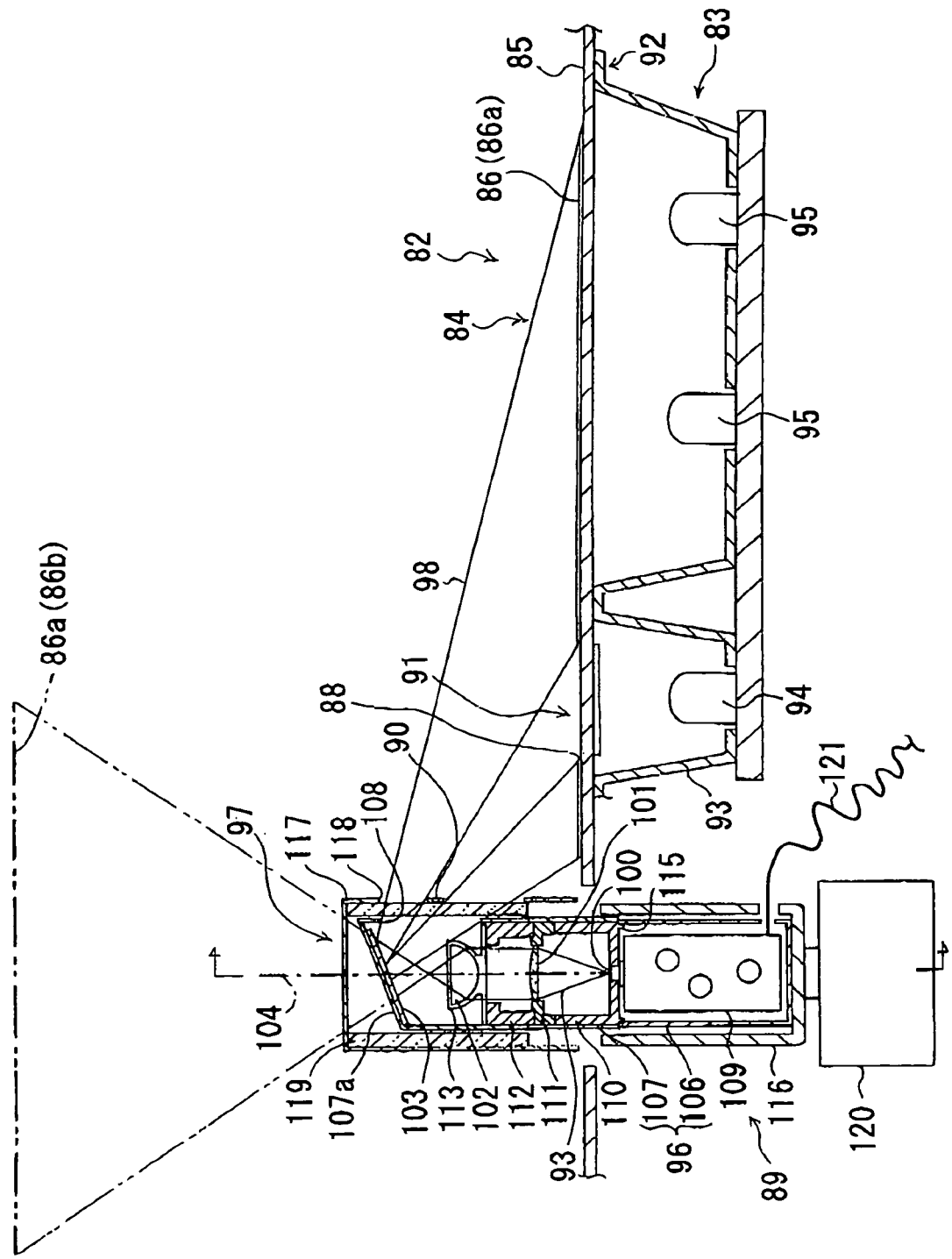
FIG. 16 is a sectional side view showing the meter displaying device in FIG. 15.
Figure 17:
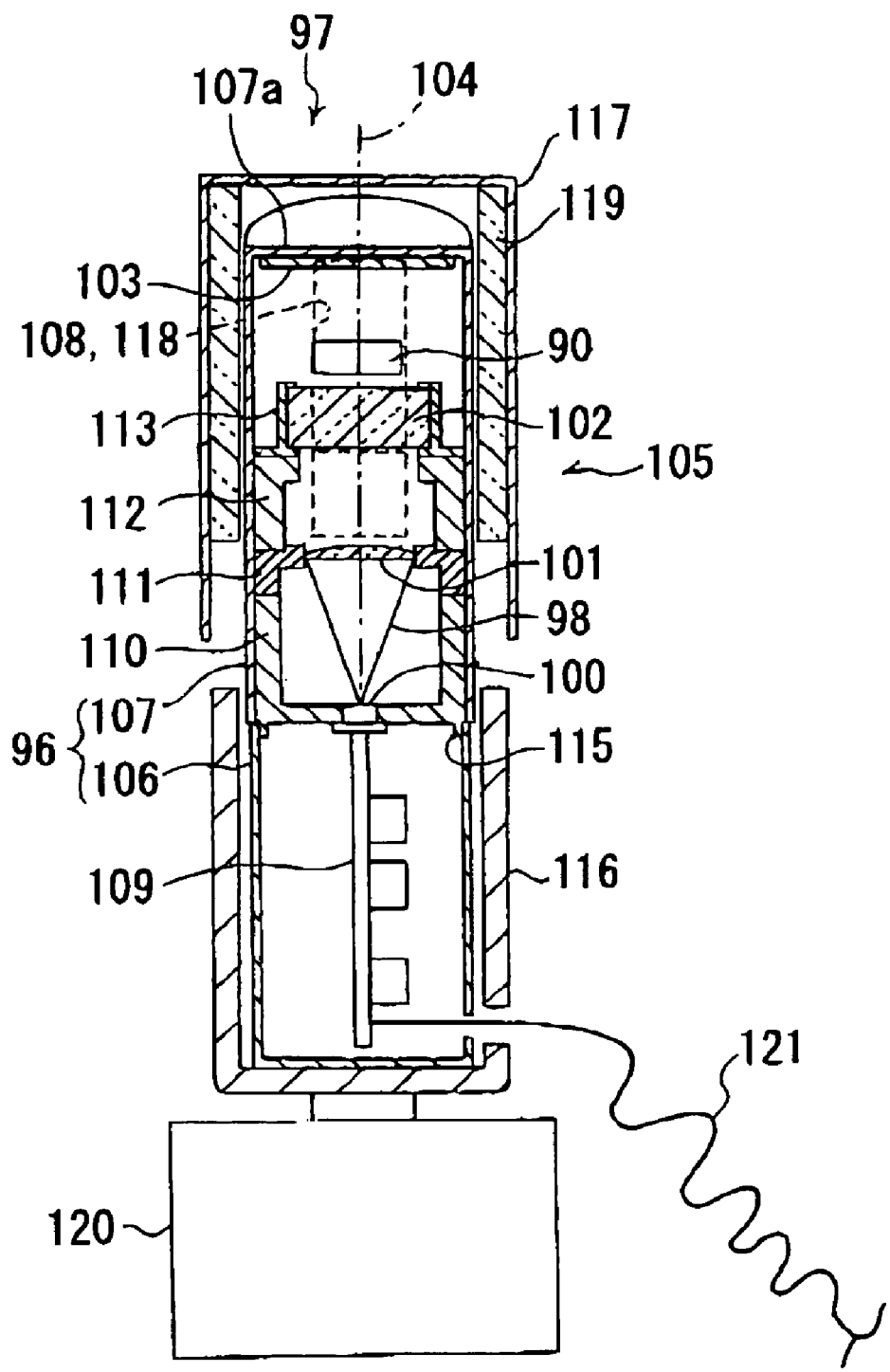
FIG. 17 is a sectional side view showing the meter-displaying device in a position in which a phase is different by 90 degree from the position shown in FIG. 16.

Because the pointer 86 is projected just above of the light pointer generating device 105, if nothing is done, as an image 86b of the pointer shown in, FIG. 16, the projected pointer is reflected on the mirror 103 attached inside the inclined end surface 107a in the front case 107 to project from the exit windows 108 and 118 to the pointer rotating area 84 of the meter surface 85 of the character plate and so on. In this way, the light pointer 86a is formed on the pointer rotating area 84. The light pointer 86a is rotated along the pointer rotating area 84 by driving the meter driving unit 120 and pivoting the light pointer generating device 105 as a whole. Consequently, the pointer 86 or the light pointer 86a is able to indicate information such as speed information on the pointer rotating area 84.

Here, because the laser source 100 as the point source capable of generating the laser beam 98, the aspheric lens 101 to focus the laser beam 98 from the laser source 100, the cylindrical lens type 102 to convert linearly the laser beam 98 focused by the aspheric lens 101, and the mirror 103 to change the direction of the laser beam 98 linearly converted by the cylindrical lens type 102 and to project it to the pointer rotating area 84 on the meter surface 85 are arranged in the straight line, it is possible to achieve miniaturization and unitization of the display unit for the vehicle by containing compactly the parts of the laser source and so on in the pointer shaft 97 as described above to form a thin shaft-like light pointer generating device, and to mount easy the display unit on the meter displaying device.

According to the aforementioned embodiment, because the light pointer 86a is provided to rotate in the pointer rotating area 84 and the discontinuous part 88 is provided on the light pointer 86a, it is possible to form the meter displaying device 83 having a discontinuously shaped pointer 86 or light pointer 86a.

In this way, since the pointer 86 or light pointer 86a is formed into a discontinuous shape, it is possible to acquire a design and a function which are not appeared in the meter displaying device 83 in the prior art. For example, it is possible to perform a display using a position where the light pointer 86a passes through the discontinuous part 88.

Moreover, because the mask 90 is provided in the projection part of the light pointer 86a from the light pointer generating device 105, it is possible to obtain the light pointer 86a having the discontinuous part 88.

Furthermore, because the indicator displaying part 91 is provided in the pointer rotating area 84, it is not necessary to provide separately a displaying area of the indicator displaying part 91, thus it is possible to integrate the pointer rotating area 84 and the indicator displaying part 91 into one. The miniaturization of the displaying unit can be achieved and visibility can be enhanced increasingly because a change of a line of sight can be minimized. It is also possible to eliminate constraint on a design. In addition, because the indicator displaying part 91 is disposed at the position where the light pointer passes through the discontinuous part 88, interference between the indicator displaying part 91 and the light pointer 86a is eliminated to be visible simultaneously the both.

Next, an embodiment of a storage device for a vehicle to accomplish the fourth object of the present invention will be explained with reference to FIGS. 18 to 22.

Figure 18:
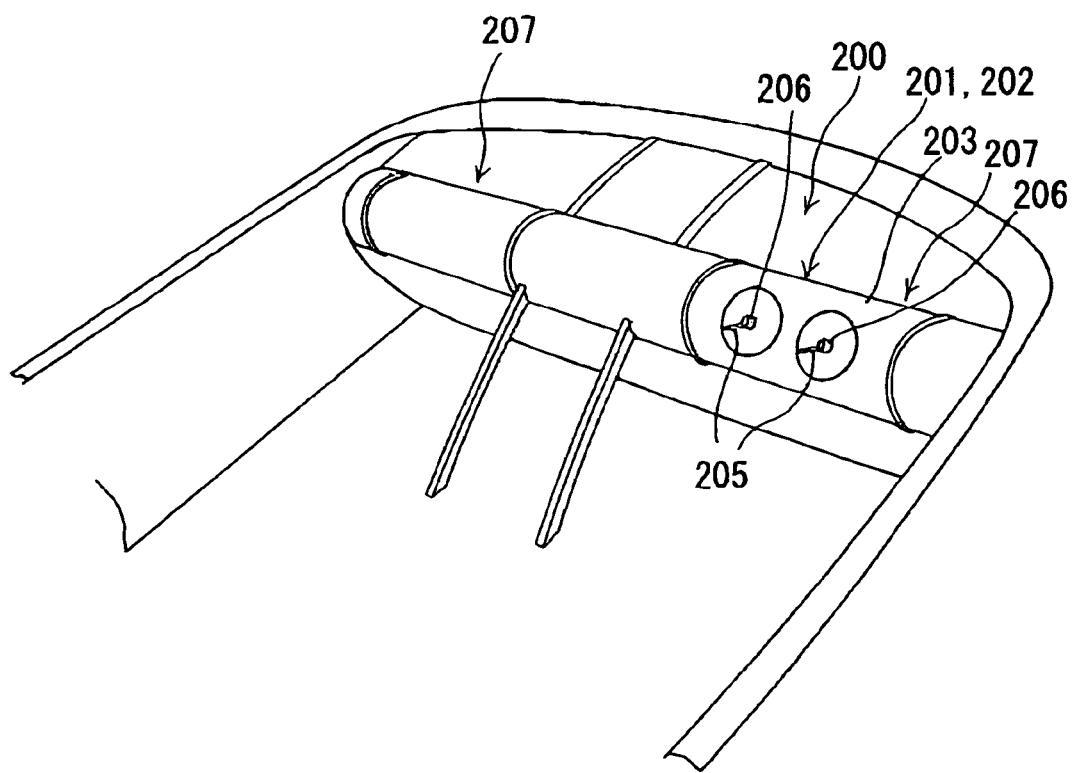
FIG. 18 is a total perspective view showing an embodiment of a storage device for a vehicle, to accomplish a fourth object of the present invention.

An instrument panel 200 is provided in a front part within a room of the vehicle, which is, for example, an automobile, as shown in FIG. 18. For example, the instrument panel 200 has at an upper portion thereof facing an occupant a generally half circular-shaped part extending generally throughout a width direction of the vehicle. The storage device 201 and a meter device 203 are provided on the half circular-shaped part.

At this time, in the embodiment, the meter device 202 is attached on a surface of a body 203 of the storage device 201. The meter device 202 includes a meter unit 206 having a pointer 205, which is formed by a linear laser beam 204.

The body 203 of the storage device is composed of upper glove boxes 207 provided on the upper portion of the instrument panel 200. The upper glove boxes 207 are disposed in front of a driver and a passenger seat. A usual glove box (not shown) may be provided in a lower portion of the upper glove box 207 in the front of the passenger seat.

Figure 19:
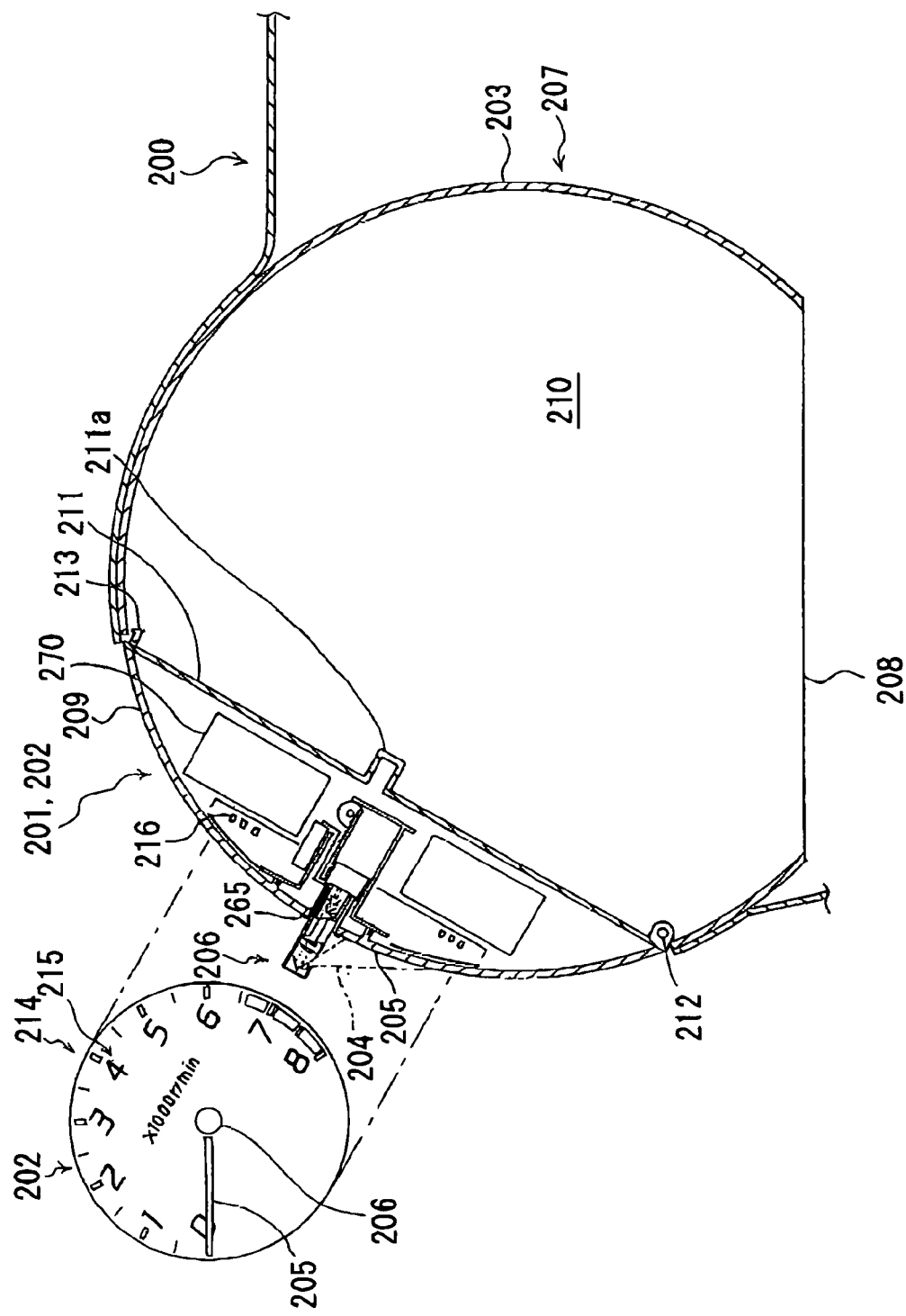
FIG. 19 is a sectional side view of FIG. 18.

As shown in FIG. 19, the body 203 of each of the upper glove boxes 207 has a generally cylindrical shape having an axis extending along the width direction of the vehicle. The body 203 has at its cylindrical portion an exit and entrance opening 208. The body 203 is also attached rotatably on the instrument panel 200 about the axis to hide and expose the exit and entrance opening 208. The instrument panel 200 is configured to contain the generally cylindrical body 203.

On the other hand, the meter unit 206 is attached to the cylindrical part exposing when the exit and entrance opening 208 hides inside the instrument panel 200. The meter unit 206 is configured to be capable of containing in the cylindrical part when the vehicle is not driven. The cylindrical part constitutes a meter surface 209 of the meter device 202. Attached on a back surface of the meter surface 209 is a partition 211, which divides between the meter unit 206 and a storage space 210 of the body 203. The meter surface 209 and the partition 211 are integrated and these are rotatably attached to the body 203 through a hinge 212 having a hinge shaft extending generally in the width direction of the vehicle. The hinge 212 is attached on a side portion of the meter surface 209. A pawl portion 213 for locking is provided on the other side portion of the meter surface 209 opposite to the hinge 212.

The meter surface 209 is formed with a character-scale area 214 having a generally circular shape as viewed from front. The meter unit 206 is disposed at a central portion of the character-scale area 214. The pointer 205 generated by the meter unit 206 extends radially of the character-scale area 214 from the center of the meter unit 206 and rotates peripherally of the character-scale area 214. The character-scale area 214 is composed of a meter surface 209 made of a transparent plate, for example, a non-transparent layer print-formed on a surface of the transparent plate remaining a character-scale part 215 and so on, and a half-transparent layer print-formed on the entire surface of the transparent plate, so that the character-scale part 215 is illuminated and configured to stand out only when lighting a back light 216 disposed on the back surface of the meter surface 209.

Figure 20:
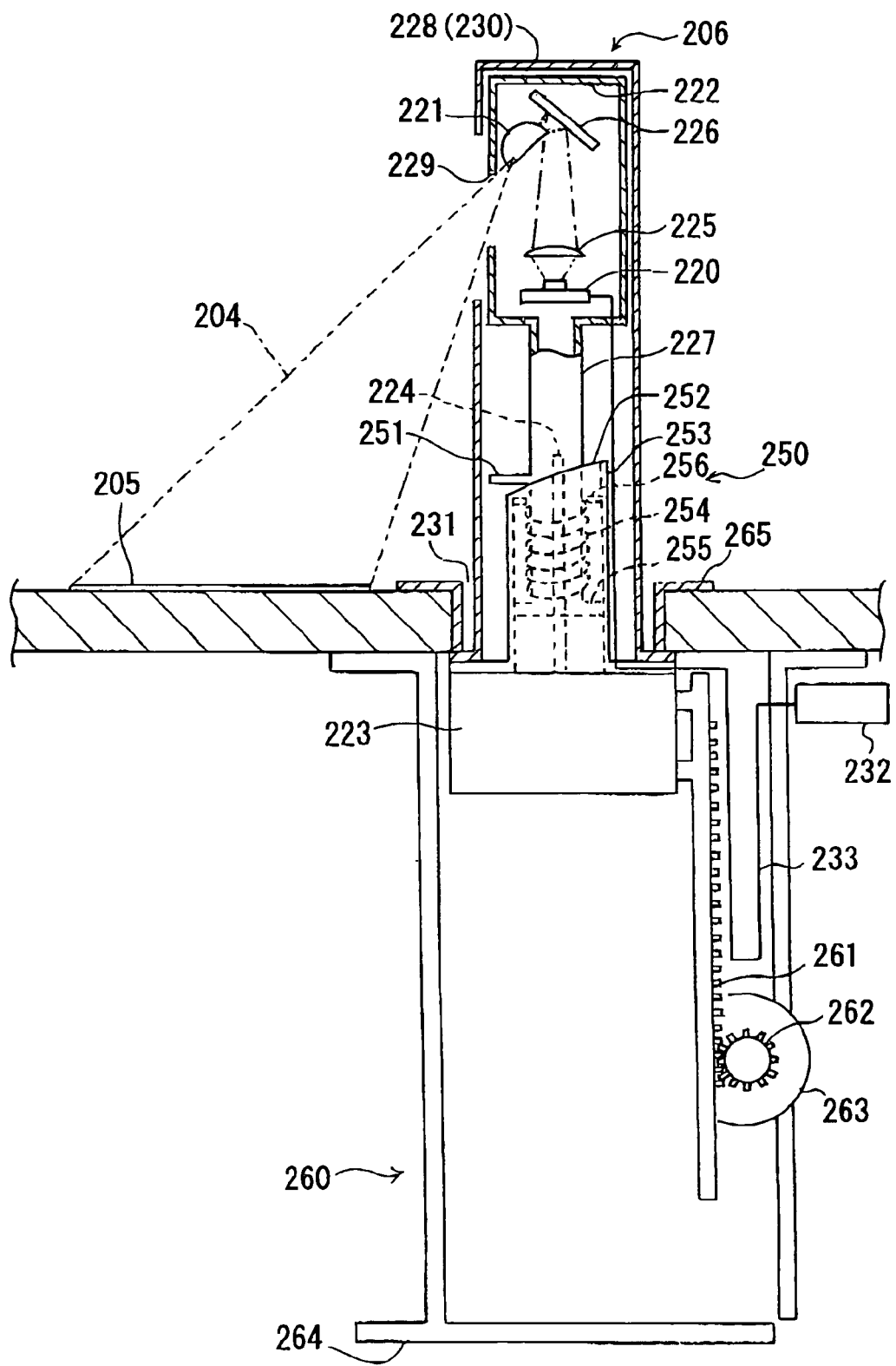
FIG. 20 is a partially enlarged view of FIG. 19.

The above-mentioned meter unit 206 comprises a laser source 220, which is substantially at least a point source, a head portion 222 having an optical system of a cylindrical lens 221 and so on, to convert linearly the laser beam 204 from the laser source 220, and a driving device 223 to rotate the head portion 222, as shown in FIG. 20.

For example, a laser diode is used for the laser source 220. The diving device 223 is disposed on the back surface of the meter surface 209. The driving device 15 includes, for example, a crossing-coil type movement, a stepping motor and so on. The head portion 222 is connected with an output shaft 224 of the driving device 223, as described below.

If necessary, supplementary optical pats of an aspheric lens 225 for collecting light, a mirror 226 for illuminating the laser beam 204 on the character-scale area 214 of the meter surface 209 by changing a direction thereof, and so on may be provided adequately in an optical path of the laser beam 204. A cylindrical central rotating shaft 227 is provided on the head portion 222 to project from an end thereof. The output shaft 224 of the driving device 223 is splined in the central rotating shaft 227 so that the output shaft 224 and the central rotating shaft 227 are rotated integrally and moved slidably with respect to each other in an axial direction. The head portion 222 and the central rotating shaft 227 are covered by means of a protecting cover 228. The protecting cover 228 is provided with a light-emitting window 229 formed throughout the pointer rotating area of the pointer 205. A transparent window member for protection may be provided in the light-emitting window 229.

The protecting cover 228 constitutes a pointer shaft 230 and also forms a design of the pointer shaft. The protecting cover 228 extends generally perpendicularly to the meter surface 209 through a hole 231 for the pointer shaft, whiz is formed in the meter surface 209 of the instrument panel 200. A basic portion of the protecting cover 228 is fixed to the driving device 223 and so on. A laser driving circuit 232 is connected with the laser source 220. The laser driving circuit 232 is disposed in a suitable position on the rear surface of the meter surface 209. The laser driving circuit 232 may be fixed directly on the rear surface of the meter surface 209 or fixed on a structural member, a substrate or the like (not shown) disposed on the rear surface of the meter surface 209. A wiring part 233 connecting the laser source 220 and the laser driving circuit 232 is passed through an inside portion of the protecting cover 228. The wiring part 233 has a desired length.

Moreover, there is provided in the meter unit 206, a height adjusting mechanism 250 to adjust a height of the head portion 222 relative to the meter surface 209 to be capable of changing a length of the light pointer 205 during projecting the light pointer 205.

The height adjusting mechanism 250 may be disposed between the head portion 222 and the driving device 223, for example. That is to say, the height adjusting mechanism 250 includes a guide pin 251 provided to project on a peripheral surface of the cylindrical central rotating shaft 227 to project sideward thereof, a guide cylinder 283 having a cam surface 252 to guide movably upward and downward the guide pin 251, and a sliding mechanism 254 to slide the guide pin 251 on the cam surface 252. Here, the guide cylinder 253 is disposed concentrically within the protecting cover 228. A basic portion of the guide cylinder 253 is fixed between the basic portion of the protecting cover 228 and the driving device 223. For example, a tension spring (not shown) disposed between a flange 255 provided on the cylindrical central rotating shaft 227 and a flange 256 provided on the guide cylinder 253 is used for the sliding mechanism 254.

If necessary, a head incoming and outgoing mechanism 260 capable of containing the head portion 222 in the meter surface 209 is provided in the meter unit 206 when the meter is not used. Here, the bead portion 222 or a head of the protecting cover 228 is structured so that it is contained in a generally flush state with the meter surface 209.

The head incoming and outgoing mechanism 260 includes, for example, a rack 261 provided on the driving device 223, a pinion 262 engaged with the rack 261, and a driving device 263 for containing to drive the pinion 262, and structured to elevate the head portion 222 with the driving device 223. For example, a stepping motor or the like is used for the driving device 263. The driving device 263 is fixed to a guide frame member 264 or the like, disposed on the rear surface of the meter surface 209 and attached on a periphery of the hole 231 for the pointer shaft.

In the drawings, the laser driving circuit 232 is also attached to the guide frame member 264. Because the protecting cover 228 is also elevated with the driving device 223, a finisher 265 or the like may be provided in a periphery of the hole 231 for the pointer shaft in the instrument panel 200. A concave portion 266 allowing the rack 261 to contain may be provided on the partition 211.

Furthermore, a meter driving circuit 270 and so on are disposed in a space between the meter surface 209 and the partition 211.

Next, an operation of the above-mentioned embodiment will be explained.

The light pointer 205 by the linear laser light is formed on the character-scale area 214 through projection of the linear laser beam 204 by collecting the laser beam 204 from the laser source 220 by the aspheric lens 225, converting linearly the laser beam by the cylindrical lens 221, changing the direction of the laser beam 204 by the mirror 226, and emitting the linear laser beam from the light-emitting window 229 to project on the character-scale area 214 of the meter surface 209.

Driving the driving device 223 causes the head portion 222 to rotate about the output shaft 224 and the central rotating shaft 227 so that the light pointer 205 is rotated along the character-scale area 214.

At this time, miniaturization of the head portion 222 or meter unit 206 can be accomplished by using a laser diode as the laser source 220. Moreover, because the pointer 205 is the laser beam 204 of a lower output, if hands touch the pointer 205 there has no affection on meter function. Therefore, a cover glass at a front surface of the meter surface 209 can be omitted. Consequently, a surface of the body 203 can be formed directly as the meter surface 209 so that the meter can be integrated with an inner packing surface of the body 203 and so on, further it is possible to make a meter broken down the existing concept.

On the contrary, because there is a fear that a substantive pointer is broken, the cover glass cannot be eliminated. Accordingly, the surface of the body 203 cannot be used directly as the meter surface 209. In this case, a character-scale displaying part of the meter may be formed in a relief on the instrument panel 1, for example, formed by painting or by a combination thereof.

Figure 21:
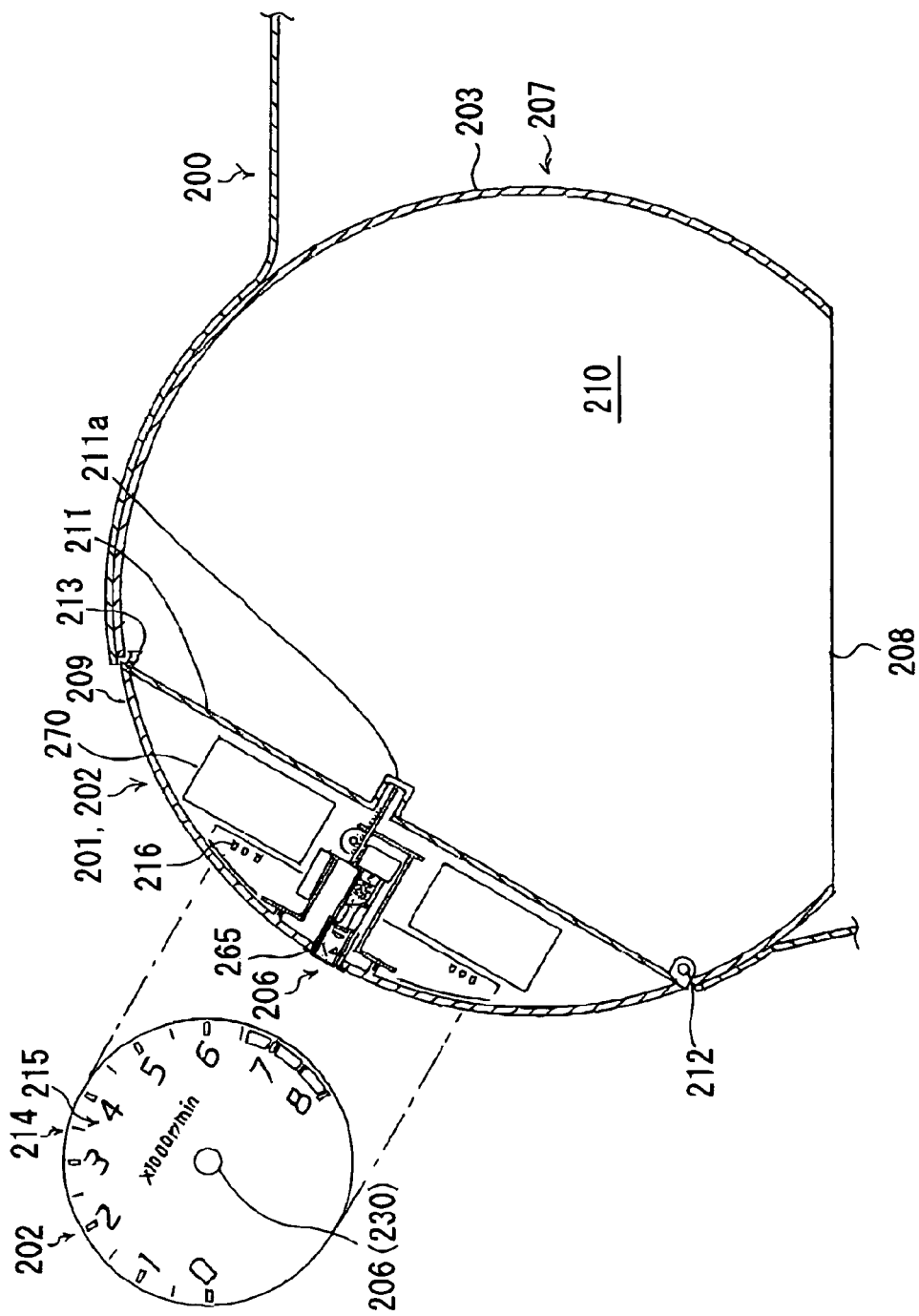
FIG. 21 is a sectional side view of FIG. 18, with a head portion contained.
Figure 22:
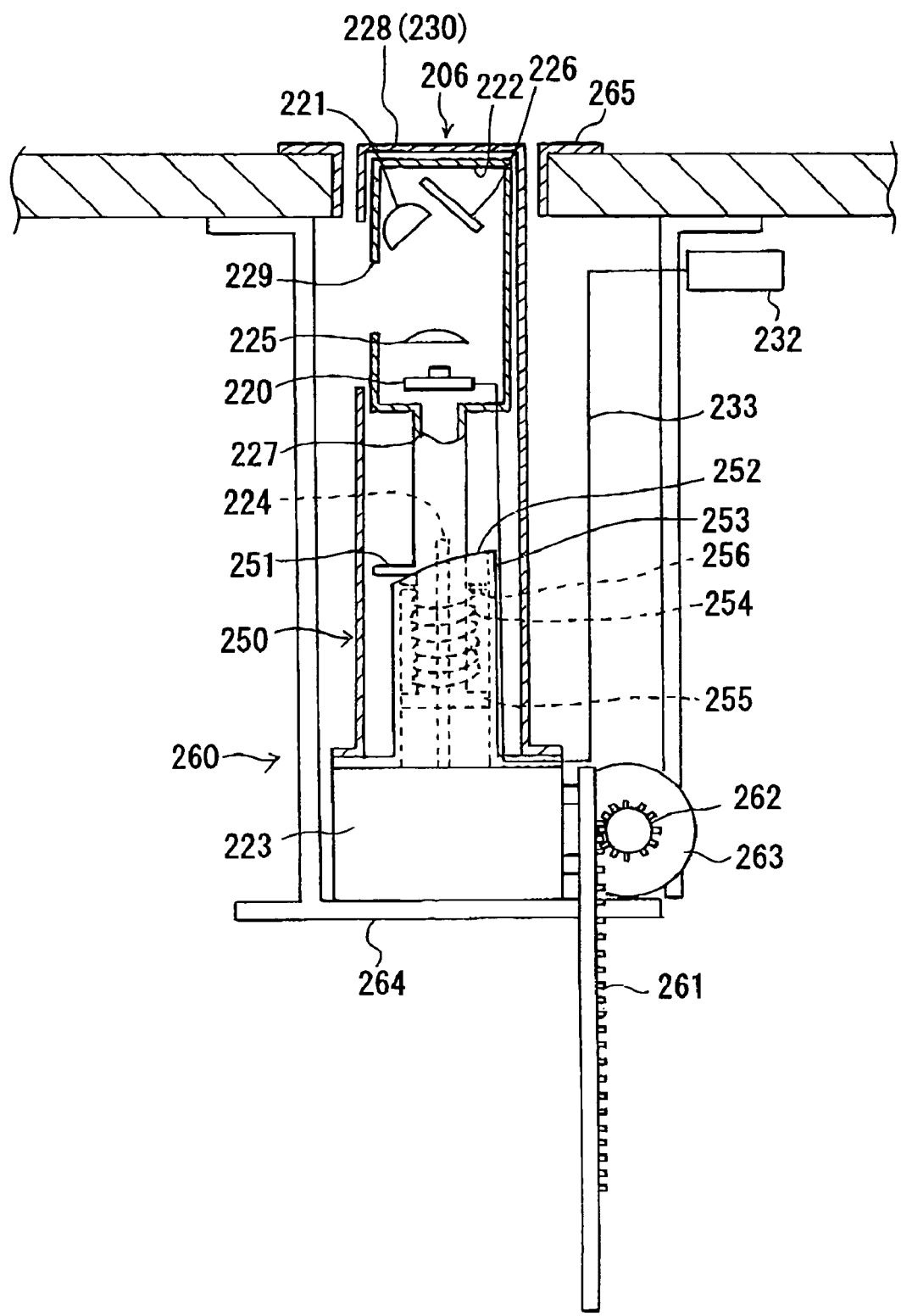
FIG. 22 is a partially enlarged view of FIG. 21.

The head portion 222 is contained in the meter surface 209 when the meter is not used, as shown in FIGS. 21 and 22. At this time, because the head portion 222 is contained in approximately flush with the meter surface 209, it is possible to shield completely the meter device 202 in the meter surface when the non-using of the meter, thereby an inner packaging surface of the body, on which the meter is not existing, can be obtained. When the meter is used, the head incoming and outgoing mechanism 260 is operated and the head portion 222 projects, as shown in FIGS. 19 and 20 so that the mere inner packaging surface of the body is formed into the meter surface 209, suddenly.

At the present time, the character-scale area 215 is illuminated and configured to stand out only when lighting the back light 216 disposed on the back surface of the meter surface 209.

After the meter is used, the head incoming and outgoing mechanism 260 is operated and the head portion 222 is again contained in the meter surface 209 as a result, the inner packaging surface of the instrument panel 200 and so on is returned to a state in which the meter surface 209 is not existing on the instrument panel 200.

In addition, the head portion 222 may be projected by turn on of an ignition switch and contained by turn off thereof. Moreover the head portion 222 may be projected or contained in cooperation with ranges of a shift lever. For example, the head portion may be contained by at least a P range and projected by the other ranges. Alternatively, for example, the head portion 14 is contained by means of an N range. At this time, blinking the linear laser beam 204 by an R range may cause attention to arise a driver and so on.

Furthermore, the head portion 222 may be adapted to project only when rotating the pointer 205.

According to the embodiment, because the meter device 202 is attached on the surface of the body 203, the body 203 and the meter device 202 are unitized so that the number of the parts is eliminated and a setting space is minimized, thereby accomplishing a large volume of the body 203. Moreover, it is possible to enhance efficiently a degree of freedom on a design in the room of the vehicle by unitization of the body 203 and the meter device 202 and to acquire a unique meter device.

Moreover, because the meter unit 206 in which the pointer 205 is formed by the linear laser beam 204 is used in the meter device 202, the pointer is not deformed and broken if the hands touch the pointer 205. Therefore, the front cover glass and a fond for protecting reflection of outside light on the cover glass can be eliminated. Consequently, it is possible to miniaturize and thin a visible part of the meter device 202. Because the pointer 205 formed by the linear laser beam 204 can also be achieved by means of a compact driving mechanism, the driving mechanism can be used reasonably with the body 203.

Moreover, because the body 203 is formed into each of the upper glove boxes 207 provided on the upper portion of the instrument panel 200, a storage part can be provided in front of a driver.

By providing the incoming and outgoing opening 208 and the meter unit 206 at separated positions on the cylindrical part of the cylindrical upper glove box 207, it is possible to use selectively the storage and the meter. By attaching the meter unit 206 to the cylindrical part of the upper glove box 207, which is rotatable, an angular adjustment of the meter unit 206 can be simplified.

Furthermore, a simple space of the room can be achieved by containing the meter unit 206 in the inside portion of the cylindrical part of the meter unit 206 when the vehicle is not driven.

Subsequently, an embodiment of a display unit for a vehicle to accomplish the fifth object of the present invention will be explained with reference to FIGS. 23 to 26.

Figure 23:
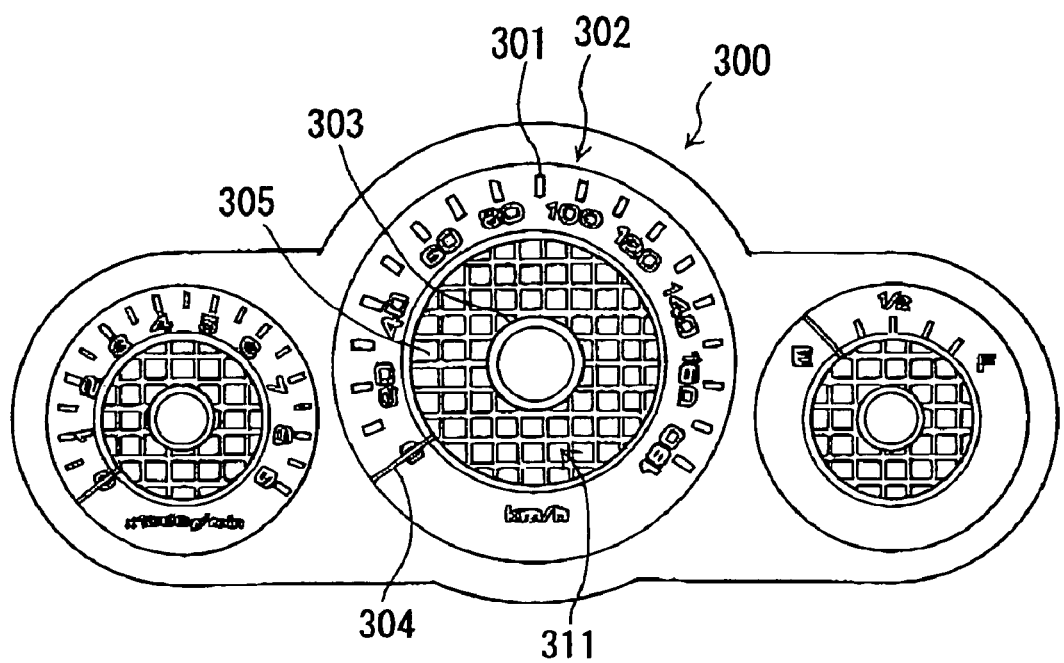
FIG. 23 is a front view showing an embodiment of a display unit for a vehicle to accomplish a fifth object of the present invention.
Figure 24:
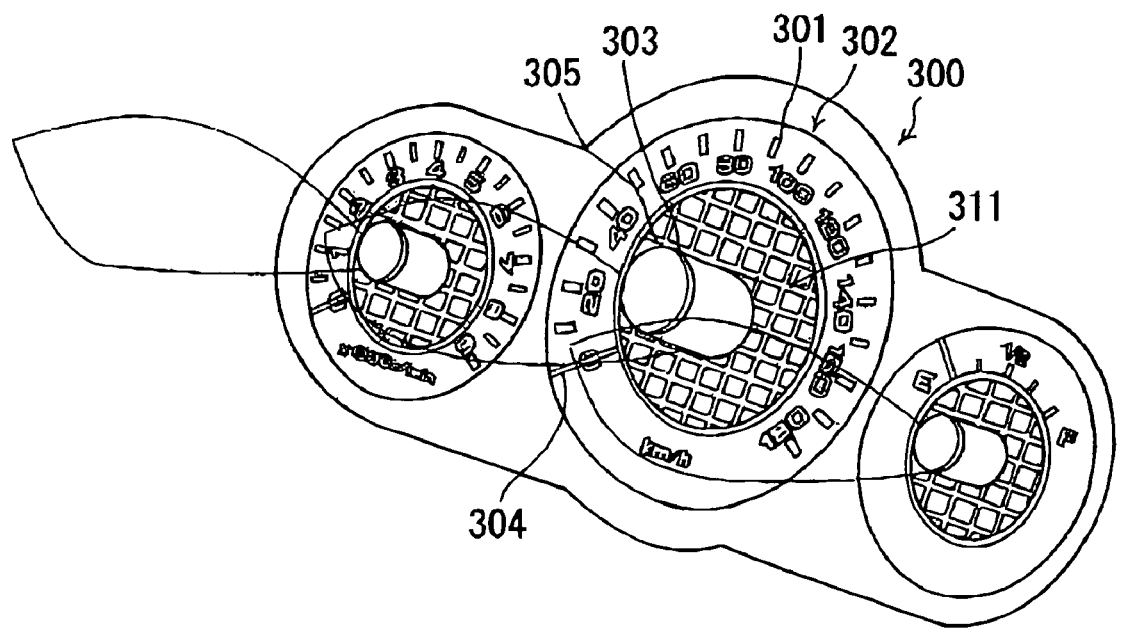
FIG. 24 is a perspective view of FIG. 23.
Figure 25:
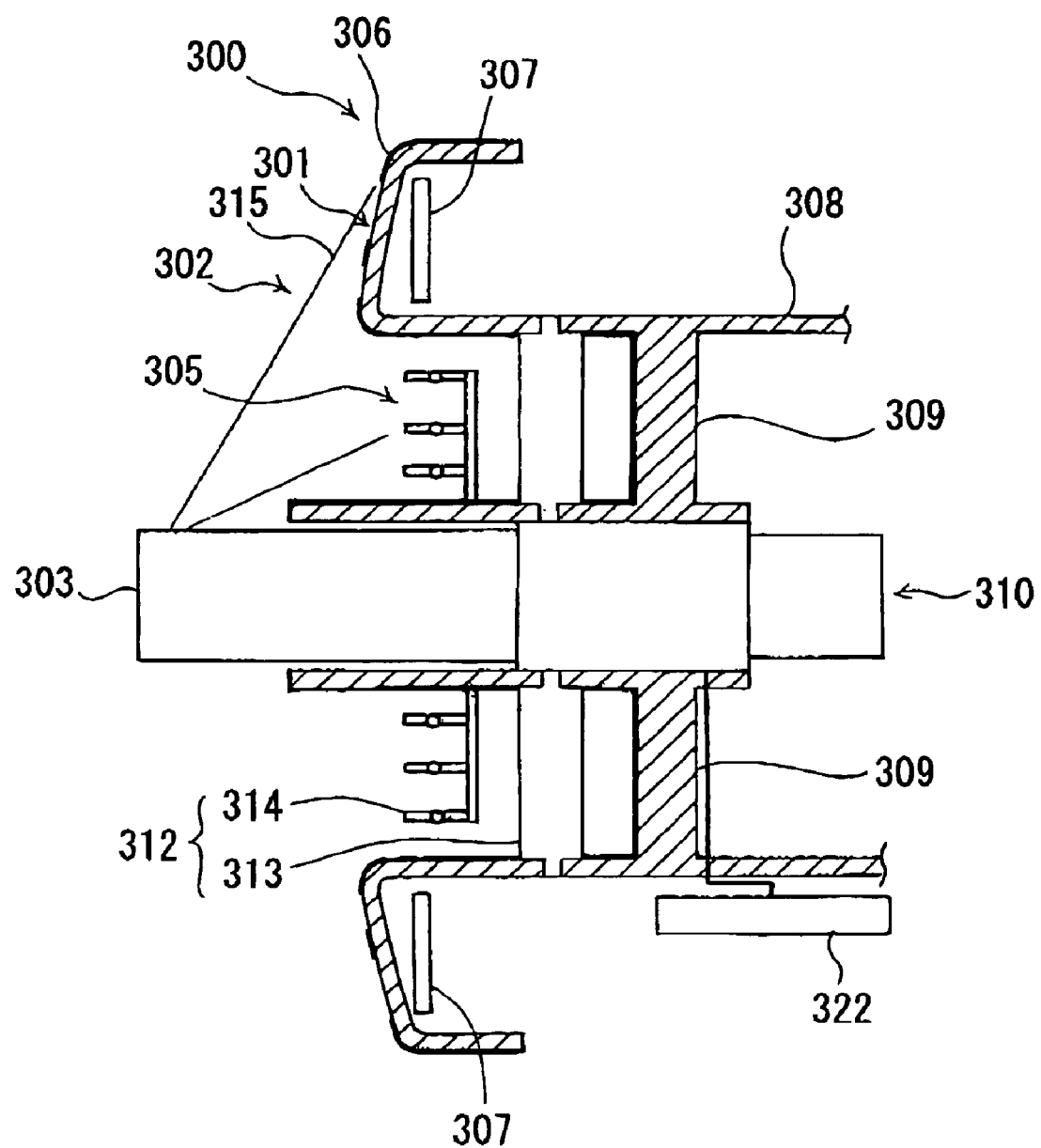
FIG. 25 is a sectional side view of FIG. 23.

Generally, a display unit 300 is provided on a part of an instrument panel 200 in a front part within a room of the vehicle, which is, for example, an automobile. The display unit 300 for the vehicle comprises an analogue type meter including a pointer rotating area 302 having at a peripheral portion thereof a character-scale part 301 and a pointer 304 having a rotational center 303 inside of the pointer rotating area 302, as shown in FIGS. 23 and 24.

The display unit 300 for the vehicle comprises a speed meter, a rotating meter and a fuel meter, for example, however is not limited to these. The character-scale part 301 has a combination of a character and a scale, but may has only the character or only the scale.

In the embodiment, one or more air-blowing openings 305 are provided inside of the pointer rotating area 302. The character-scale part 301 is therefore formed on a surface of a frame-shaped member 306. The frame-shaped member 306 has a generally ring-like shape as viewed from front. The frame-shaped member 306 is made of a transparent resin, for example. The character-scale part 301 is formed by application of a color-print, remaining a portion on which the character-scale part 301 is formed on at least the surface of the frame-shaped member 306. A light source 307 is disposed on a back surface of the frame-shaped member 306 to illuminate the character-scale part 301. Meanwhile, the character-scale part 301 can be formed by various existing arts other than the above.

A short cylindrical air grill part 308 extends from an inner peripheral portion of the frame-shaped member 306 to the back surface thereof. A meter unit 310 is supported through a support 309 on an inside portion of the air grill part 308. In addition, the meter unit 310 is preferably disposed at an axial position of the air grill part 308. The support 309 is preferably disposed in parallel with a flowing direction of air as a wing-like shape or thin welled rectangle-like shape. An air duct (not shown) is connected with an end of the back surface of the air grill part 308. The air duct has a shutting valve, which is capable of opening and closing. Moreover, a ventilating member 311 such a mesh, lattice, honeycomb, or the like is provided in the inner peripheral portion of the frame-shaped member 306 and the air grill part 308 (see FIGS. 23 and 24). Alternatively, a louver member 312 may be provided in the peripheral portion and the air grill part 308 (see FIG. 26). The louver member 312 includes a longitudinal louver 313 and a lateral louver 314. The louver member 312 may be variable an angle, or may not be variable the angle (in an example shown in FIG. 25, the angle is variable). An existing art is used for an angle-variable mechanism for the louver member 312. Meanwhile, the meter unit 310 passes through the ventilating member 311 and the louver member 312 and is adapted to project from the surfaces thereof.

Figure 26:
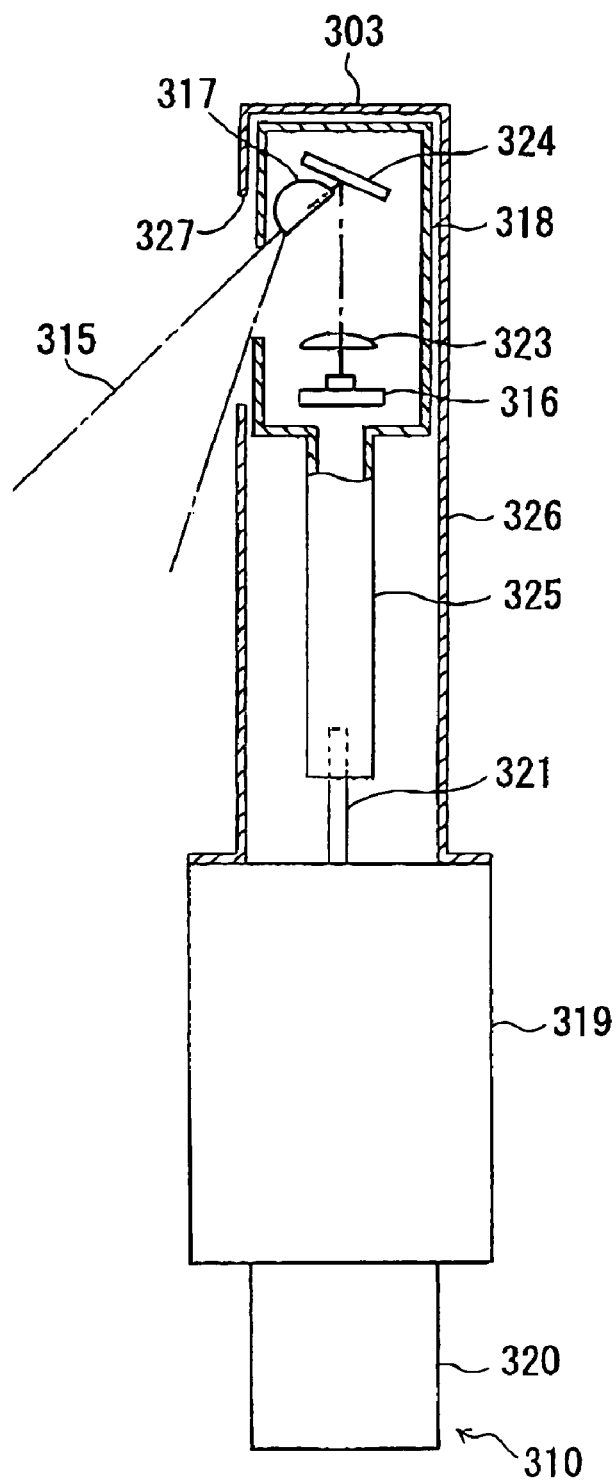
FIG. 26 is a sectional side view of a pointer shaft shown in FIG. 23.

The pointer 304 is formed by means of a linear laser beam 315. Therefore, the meter unit is structured as shown in FIG. 26. That is to say, the above-mentioned meter unit 310 comprises a laser source 316, which is substantially at least a point source, a head portion 318 having a cylindrical lens 317 and so on, to convert linearly the laser beam 315 from the laser source 316, a driving device 319 to rotate the bead portion 318, and a laser driving circuit 320, which are disposed on the same axis and formed integrally into a short shaft-like shape.

For example, a laser diode is used for the laser source 316. The driving device 319 includes, for example, a crossing-coil type movement, a stepping motor and so on. The head portion 318 is connected with an output shaft 321 of the driving device 319, as described below. A meter driving circuit 322 for driving the driving device 319 is provided on an outer peripheral portion of the air grill part 308. A wiring portion for connect the driving device 319 and the meter driving circuit 322 is disposed along the support 309.

If necessary, supplementary optical parts of an aspheric lens 323 for collecting light, and a mirror 324 for changing a direction of the laser beam 315 are provided in an optical path of the laser beam 315. A cylindrical central rotating shaft 325 is provided on the head portion 318 to project from an end thereof. The output shaft 321 of the driving device 319 is splined in the central rotating shaft 325 so that the output shaft 321 and the central rotating shaft 325 are rotated integrally and moved slidably with respect to each other in an axial direction. The head portion 318 and the central rotating shaft 325 are covered by means of a protecting cover 326. The protecting cover 326 is provided with a light-emitting window 327 formed throughout the pointer rotating area of the pointer 205. The protecting cover 326 constitutes the head portion 318 and a design of a pointer shaft. The laser driving circuit 320 is connected with the laser source 316. A wiring portion (not shown) connecting the laser source 316 and the laser driving circuit 320 is also covered by means of the protecting cover 326.

Next, an operation of the above-mentioned embodiment will be explained.

The light pointer 304 by the linear laser beam 315 is formed on the pointer rotating area 302 by collecting the laser beam 315 from the laser source 316 by the aspheric lens 323, changing the direction of the laser beam 315 by the mirror 324, converting linearly the laser beam 315 by the cylindrical lens 317 and projecting the linear laser beam to the pointer rotating area 302.

Driving the driving device 319 causes the head portion 318 to rotate about the output shaft 321 and the central rotating shaft 325 so that the light pointer 304 is rotated along the pointer rotating are 302.

Air from an air conditioning device (not shown) is blown from the air-blowing opening 305 provided inside of the pointer rotating area 302 into the room of the vehicle through an air duct (not shown) and the air grill part 308.

In this way, by providing the air-blowing opening 305 inside of the pointer rotating area 302, a meter and the air-blowing opening 305 are unitized so that the number of the parts is eliminated, a setting space is minimized, and increment of a degree of freedom on a design in the instrument panel is obtained.

Moreover, if the meter is disposed in front of a driver seat, because the air-blowing opening 305 can be disposed in the front of a driver, a good air conditioning effect is obtained, and it is possible to acquire air conditioning effect in which a sleeping is prevented by spot cool down, which is not expected in the prior art.

Because the pointer 304 is formed by means of the linear laser beam 315, if a front cover glass for the meter is eliminated to expose the air-blowing opening 305, the pointer 304 is not deformed and broken if the hands touch the pointer 304. Furthermore, because the pointer 304 can be achieved by means of a compact device, the meter, or display unit can be used reasonably with the air-blowing opening 305.

Next, an embodiment of a display unit for a vehicle to accomplish the sixth object of the present invention will be explained with reference to FIGS. 27 to 32.

Figure 27:
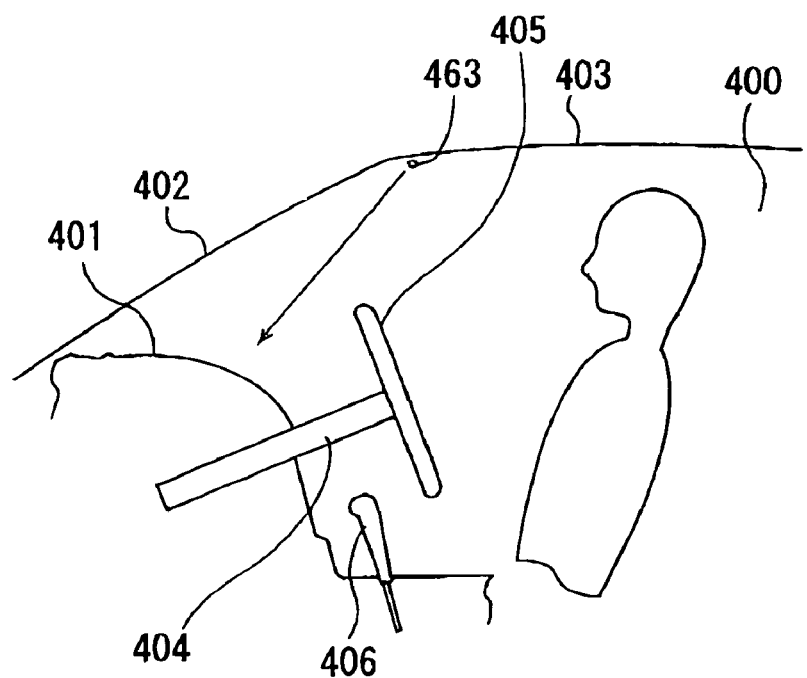
FIG. 27 is a total perspective view of an embodiment of a display unit for a vehicle to accomplish a sixth object of the present invention.
Figure 28:
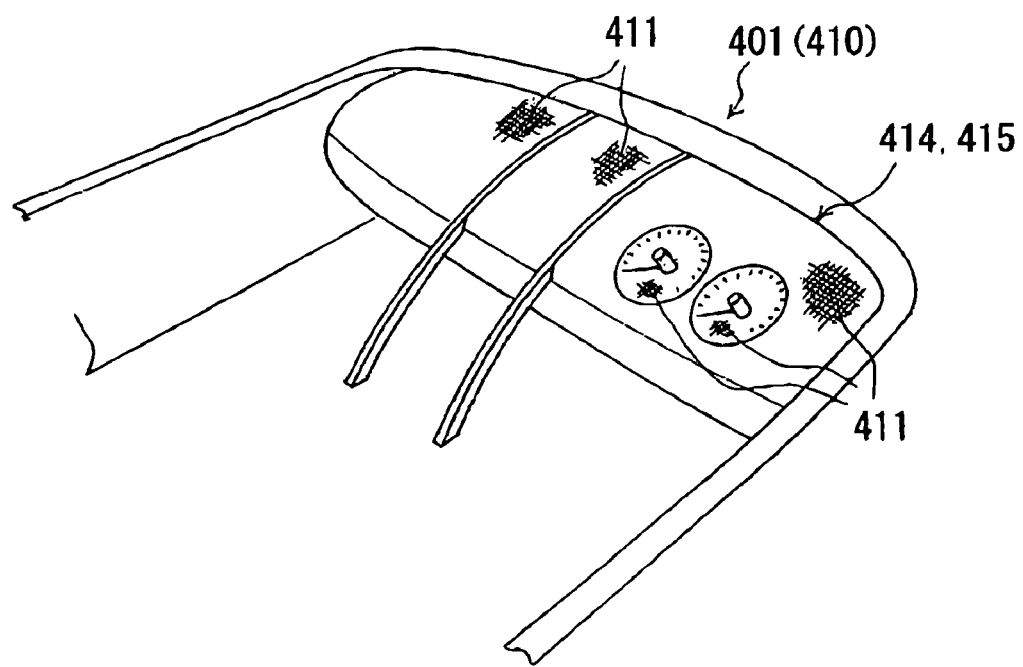
FIG. 28 is a perspective view of an instrument panel in FIG. 27.

An instrument panel 401 is provided in a front part within a room 400 of the vehicle, which is, for example, an automobile, as shown in FIGS. 27 and 28.

In addition, in FIG. 27, numeral 402 denotes a front window glass, numeral 403 a ceiling of the room 400, numeral 404 a steering column, numeral 405 a steering wheel, numeral 406 a shift lever.

Figure 29:
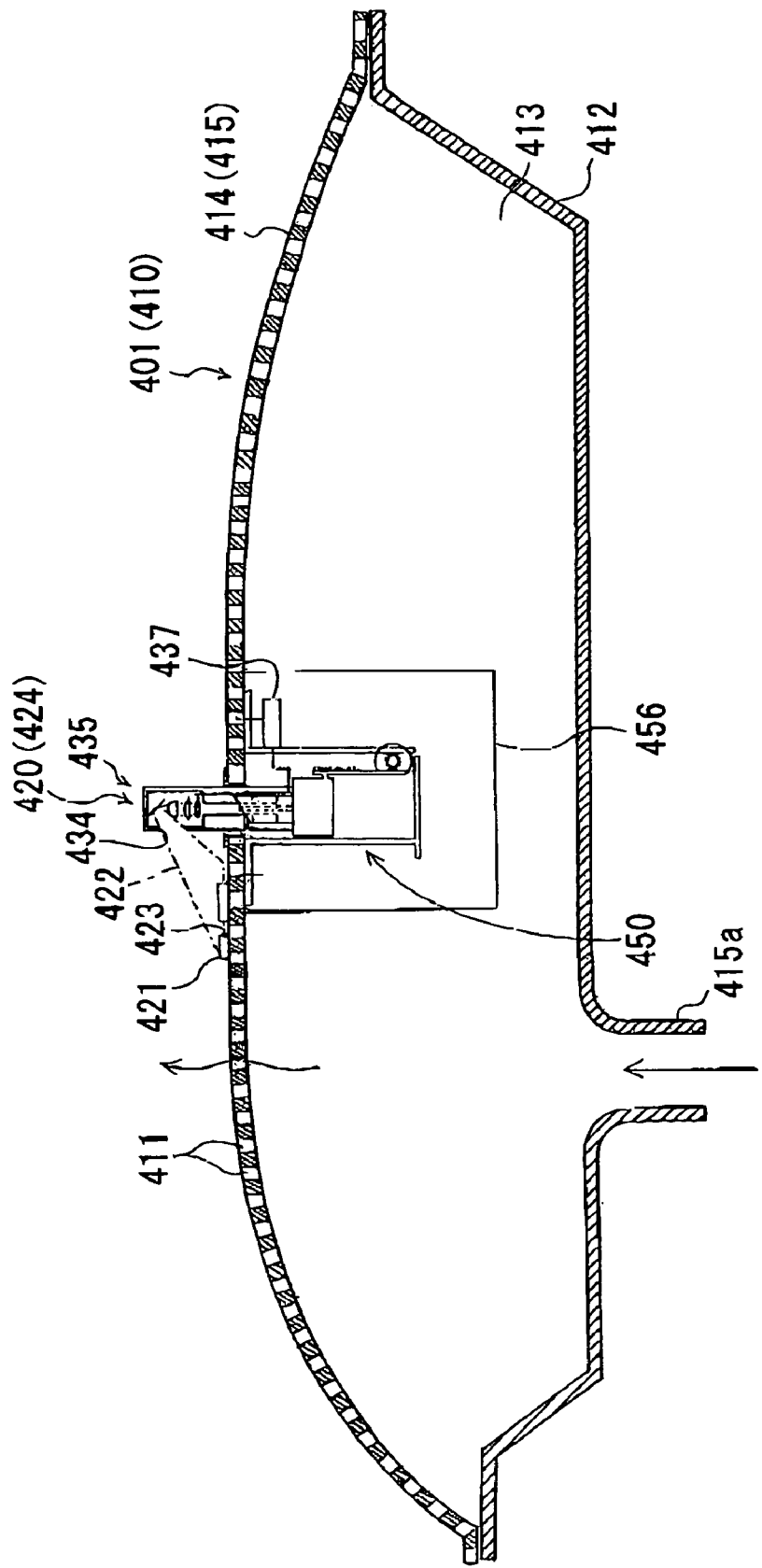
FIG. 29 is a sectional side view of the instrument panel in FIG. 28.

In the embodiment, the instrument panel 401 is provided with an air header 410, which is configured to collect air in one section and distribute the air, as shown in FIG. 29. A great number of air-blowing openings 411 are formed throughout approximately the whole of a surface of the instrument panel 401. The air-blowing openings 411 are also formed to distribute on the entire area of the surface of the instrument panel 401 in a width direction of the vehicle and forward and backward directions of the vehicle. Although the air-blowing openings 411 are distributed equally in the embodiment, are not limited to the disposition. The air-blowing openings may be disposed in any pattern for any purpose. Even if there is a portion on which the air-blowing openings 411 are not provided, this case is also included in the present invention assuming that the air-blowing openings 411 are provided in the entire area of the surface of the instrument panel 401, if the case that the air-blowing openings are not provided is substantially the same as in the case that the openings are provided, in effect. Moreover, sizes of the air-blowing openings 411 may be equal with respect to each other, or different sizes thereof may be combined.

To embody the above, the instrument panel 401 is composed of an instrument panel body 412 of a generally concave shape as viewed from side and a surface cover 414 attached to the instrument panel body 412 so as to form a header space 413 above of the instrument panel body 412. The surface cover 414 is formed by a madreporite 415.

The instrument panel provided with the air header 410 has an air suction opening 415a projecting downwardly from the instrument panel body 412 at a generally central portion in the width direction of the vehicle. An air outlet (not shown) of an air conditioning unit is connected directly and indirectly with the air suction opening 415a. For example, a punching plate, a net-like sheet, a cloth (woven cloth and non-woven cloth), and so on are used for the surface cover 414 composed of the madreporite 415. However, a desired strength and shape retention are required to use as the surface cover 414. Attachment of the surface cover 414 to the instrument panel body 412 is not shown in the drawings, but a screw cramp, a latch structure by a resin pawl or the like is used. A seal member (not shown) may be used on a mating surface of the instrument panel body 412 and the surface cover 414.

Figure 30:
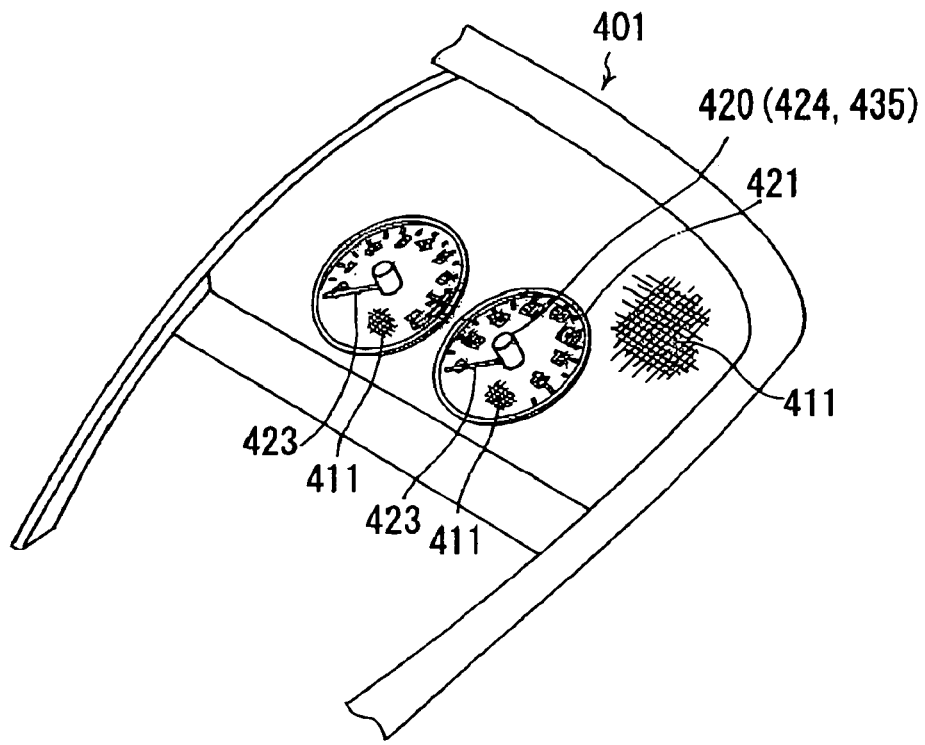
FIG. 30 is a partially enlarged view of FIG. 28.
Figure 31:
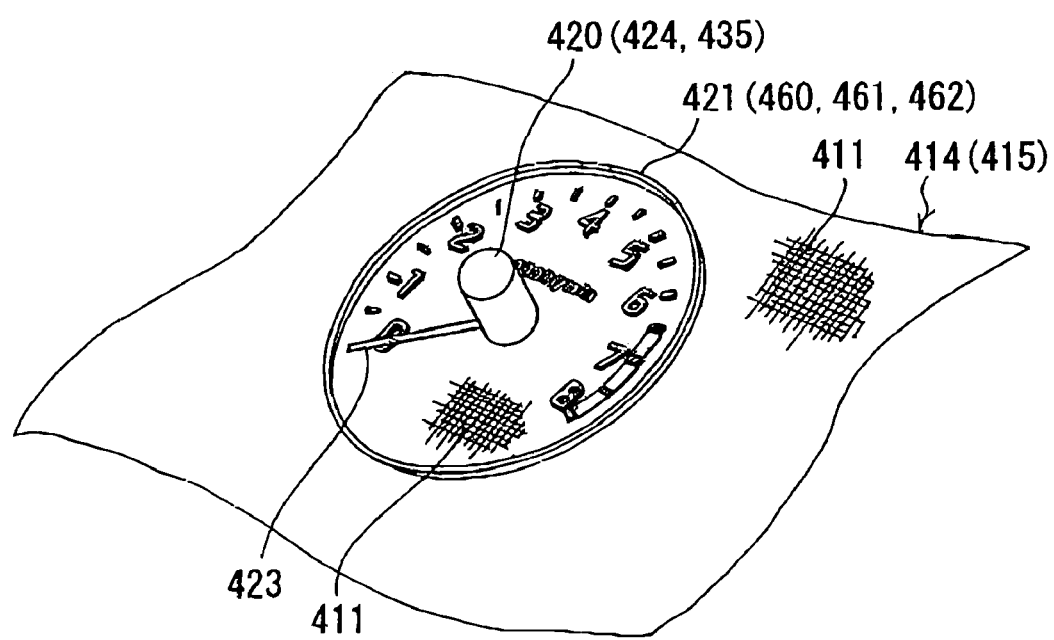
FIG. 31 is a partially enlarged view of FIG. 30.

Moreover, as shown in FIGS. 30 and 31, a meter device 420 is attached to the surface cover 414 and a character-scale area 421 is formed on the surface cover 414. The character-scale area 421 is formed on a peripheral portion of the meter device 420. The character-scale area 421 is preferably formed into a generally circular shape about the meter device 420.

The meter device 420 has a meter unit 424 for generating a linear laser beam 422 as a pointer 423, as shown in FIG. 29. The pointer 423 generated by the meter unit 424 extends radially of the character-scale area 421 centering on the meter unit 424 and is rotated peripherally of the character-scale area 421.

The above-mentioned meter unit 420 comprises a laser source 425, which is substantially at least a point source, a head portion 427 having an optical system of a cylindrical lens 426 and so on, to convert linearly the laser beam 422 from the laser source 425, and a driving device 428 to rotate the head portion 427.

For example, a laser diode is used for the laser source 425. The driving device 428 is disposed on a back surface of the surface cover 414. The driving device 428 includes, for example, a crossing-coil type movement, a stepping motor and so on. The head portion 427 is connected with an output shaft 429 of the driving device 428, as described below.

If necessary, supplementary optical parts of an aspheric lens 430 for collecting light, a mirror 431 for illuminating the laser beam 422 on the character-scale area 421 of the surface cover 414 by changing a direction thereof, and so on may be provided adequately in an optical path of the laser beam 422. A cylindrical central rotating shaft 432 is provided on the head portion 427 to project from an end thereof. The output shaft 429 of the driving device 428 is splined in the central rotating shaft 432 so that the output shaft 429 and the central rotating shaft 432 are rotated integrally and moved slidably with respect to each other in an axial direction. The head portion 427 and the central rotating shaft 432 are covered by means of a protecting cover 433. The protecting cover 433 is provided with a light-emitting window 434 formed throughout the pointer rotating area 421 of the pointer 423. A transparent window member for protection may be provided in the light-emitting window 434.

The protecting cover 433 constitutes a pointer shaft 435 and also forms a design of the pointer shaft 435. The protecting cover 433 extends generally perpendicularly to the surface cover 414 from a hole 436 for the pointer shaft, which is formed in the surface cover 414 of the instrument panel 401. A basic portion of the protecting cover 433 is fixed to the driving device 428 and so on. A laser driving circuit 437 is connected with the laser source 425. The laser driving circuit 437 is disposed in a suitable position on a rear surface of the instrument panel 401. The laser driving at 437 may be fixed directly on the rear surface of the instrument panel 401 or fixed on a structural member, a substrate or the like (not shown) disposed on the rear surface of the instrument panel 401. A wiring part 438 connecting the laser source 425 and the laser driving circuit 437 is passed through an inside portion of the protecting cover 433. The wiring part 438 has a desired length.

Moreover, if necessary, there is provided in the meter unit 424, a height adjusting mechanism 440 to adjust a height of the head portion 427 relative to the surface cover 414 to be capable of changing a length of the light pointer 423 while projecting the light pointer 423.

The height adjusting mechanism 440 may be disposed between the head portion 427 and the driving device 428, for example. That is to say, the height adjusting mechanism 440 includes a guide pin 441 provided to project on a peripheral surface of the cylindrical central rotating shaft 432 to project sideward thereof, a guide cylinder 443 having a cam surface 442 to guide movably upward and downward the guide pin 441, and a sliding mechanism 447 to slide the guide pin 441 on the cam surface 442. Here, the guide cylinder 443 is disposed concentrically inside the protecting cover 433. A basic portion of the guide cylinder 443 is fixed between the basic portion of the protecting cover 433 and the driving device 428. For example, a tension spring 446 and so on disposed between a flange 444 provided on the cylindrical central rotating shaft 432 and a flange 445 provided on the guide cylinder 443 are used for the sliding mechanism 443.

Figure 32:
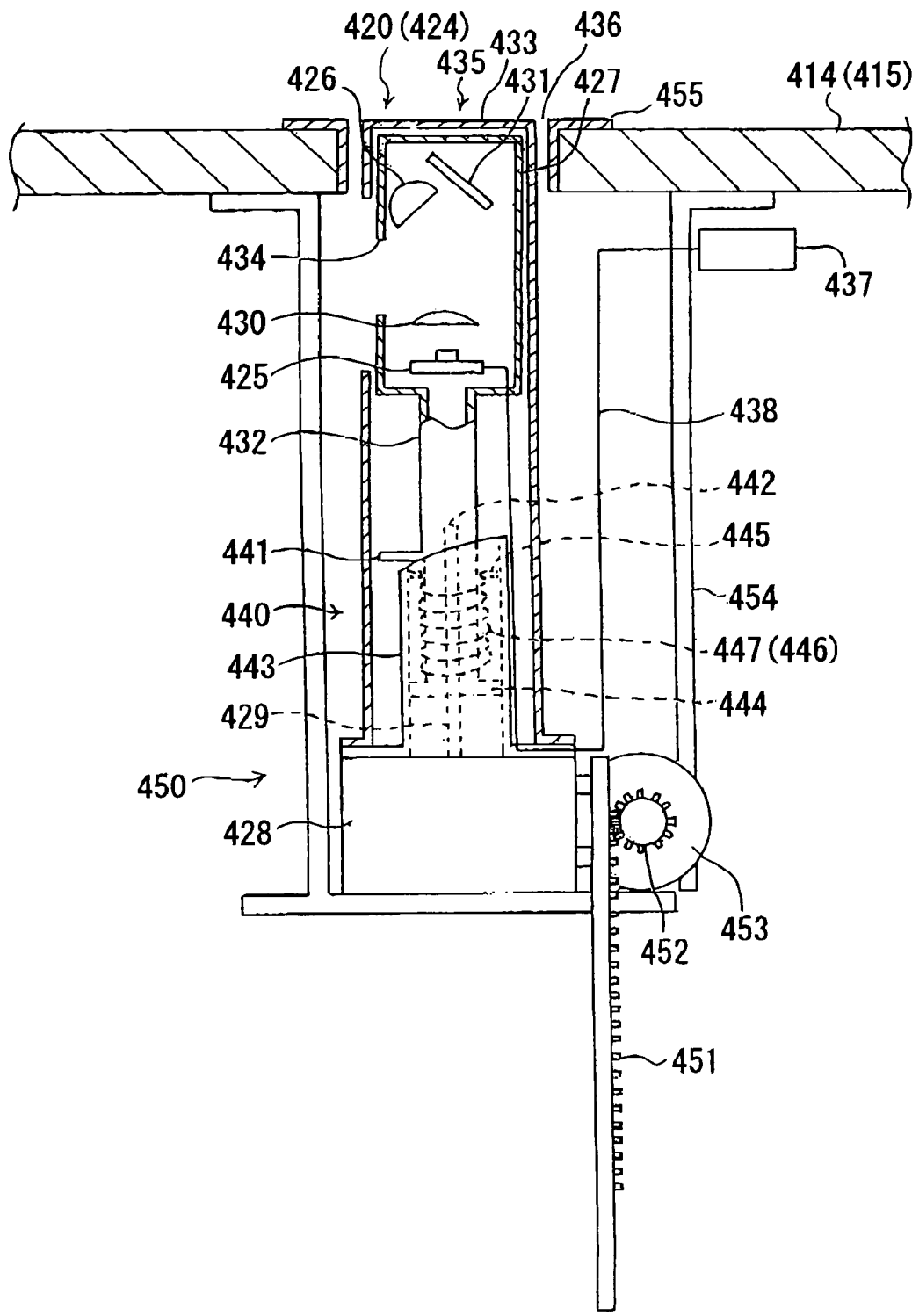
FIG. 32 is a partially enlarged view of FIG. 29, with a head portion contained.

If necessary, a head incoming and outgoing mechanism 450 capable of containing the head portion 427 in the surface cover 414 is provided in the meter unit 424 when the meter is not used, as shown in FIG. 32. Here, the head portion 427 or a head of the protecting cover 433 is structured so that it is contained in a generally flush state with the surface cover 414.

The head incoming and outgoing mechanism 450 includes, for example, a rack 451 provided on the driving device 428, a pinion 452 engaged with the rack 451, and a driving device 453 for containing, to drive the pinion 452, and structured to elevate the head portion 427 with the driving device 428. For example, a stepping motor or the like is used for the driving device 453. The driving device 453 is fixed to a guide fine member 454 or the like, disposed on the rear surface of the instrument panel 401 and attached on a periphery of the hole 436 for the pointer shaft.

In the drawings, the laser driving circuit 437 is also attached to the guide frame member 454. Because the protecting cover 433 is also elevated with the driving device 428, a finisher 455 or the like may be provided in a periphery of the hole 436 for the pointer shaft in the instrument panel 401. Portions extending in the header space 413 of the meter unit 424, which include the height adjusting mechanism 440 and head incoming and outgoing mechanism 450 are covered by a surround 456.

The character-scale area 421 is formed by provision of concave and convex shapes 460 on the surface cover 414, for example. Moreover, if necessary, a color paint 461 is attached to the concave and convex shapes to be visible them in daytime. In addition, a UV paint 462 may be attached on the color paint 461 and a UV illuminating device may be provided on the ceiling 403 of the room 400 to light-emit the a portion on which the UV paint is attached by the lighting of the UV illuminating device 463 in night.

Next, an operation of the above-mentioned embodiment will be explained.

The light pointer 423 by the linear laser beam 422 is formed on the character-scale area 421 through projection of the linear laser beam 422 by collecting the laser beam 422 from the laser source 425 by the aspheric lens 430, converting linearly the laser beam by the cylindrical lens 426, changing the direction of the laser beam 422 by the mirror 431, and emitting the linear laser beam from the light-emitting window 434 to project on the character-scale area 421 of the surface cover 414.

Driving the driving device 428 causes the head portion 427 to rotate about the output shaft 429 and the central rotating shaft 432 so that the light pointer 423 is rotated along the character-scale area 421.

At this time, miniaturization of the head portion 427 or meter unit 424 can be accomplished by using the laser diode as the laser source 425. Moreover, because the pointer 423 is the laser beam 422 of a lower output, if hands and so on touch the pointer 423 there has no affection on a meter function. Therefore, a cover glass at a front surface of the surface cover 414 can be omitted. Consequently, a surface of the instrument panel 401 can be formed directly as the surface cover 414 so that the meter device 420 can be integrated with an inner packing surface of the instrument panel 401 and so on, further it is possible to make a meter broken down the existing concept.

On the contrary, because there is a possibility that a substantive pointer is broken, different from the light pointer, the cover glass cannot be eliminated. Accordingly, the surface of the instrument panel 401 cannot be used directly as the meter surface. In this case, a character-scale displaying part of the character-scale area 421 may be formed in a relief, formed by painting or by a combination thereof, on the instrument panel 401.

The head portion 427 is contained in the surface cover 414 when the meter is not used, as shown in FIG. 32. At this time, because the head portion 427 is contained in approximately flush with the surface cover 414, it is possible to shield completely the meter device 420 in the surface cover when the non-using of the meter, as shown in FIG. 29, thereby an inner packaging surface of the surface cover, on which the meter is not existing, can be obtained. When the meter is used, the head incoming and outgoing mechanism 450 is operated and the head portion 427 projects, as shown in FIG. 29, so that the mere inner packaging surface of the instrument panel 401 is formed into the meter surface, suddenly.

At the present time, the UV illuminating device 463 provided on the ceiling 403 of the room 400 is turned on, in the night and so on, the UV paint 462 is light-emitted to illuminate the character-scale displaying part of the character-scale area 421. After the meter is used, the head incoming and outgoing mechanism 460 is operated and the head portion 427 is again contained in the surface cover 414, as a result, the inner packaging surface of the instrument panel 401 and so on is returned to a state in which the meter surface is not existing.

In addition, the head portion 427 may be projected by turn on of an ignition switch and contained by turn off thereof. Moreover the head portion 427 may be projected or contained in cooperation with rages of a shift lever. For example, the head portion may be contained on at least a P range and projected by the other ranges. Alternatively, for example, the head portion 427 is contained by means of an N range. At this time, blinking the linear laser beam 422 on an R range may cause attention to arise a driver and so on.

Furthermore, the head portion 427 may be adapted to project only when rotating the pointer 423.

According to the embodiment, because the air header 410 is formed on instrument panel 401, an air duct and the others are can be eliminated and a space within the instrument panel 401 can be set adequately, and therefore a space for the header having a sufficient section can be maintained.

Because air is blown out from the air-blowing openings formed through the entire area on the surface of the instrument panel 401 to form the air header 410, it is possible to acquire an air conditioning effect that soft and uniform air is blown out through the whole of the room 400.

Moreover, the meter device 420 is attached to the surface cover 414 of the madreporite 415 and the character-scale area 421 is formed on the surface cover 414, the instrument panel 401 and the meter device 420 are unitized so that the number of the parts is eliminated and a setting space is minimized. Moreover, it is possible to enhance efficiently a degree of freedom on a design in the room 400 of the vehicle by unitization of the instrument panel 401 and the meter device 420 and to acquire a unique meter device.

Moreover, because the meter unit 424 in which the pointer 423 is formed by the linear laser beam 422 is used in the meter device 420, the pointer 423 is not deformed and broken if the hands touch the pointer 423. Therefore, the front cover glass and a food for protecting reflection of outside light on the cover glass can be eliminated. Consequently, it is possible to miniaturize and thin a visible part of the meter device 420. Because the pointer 423 formed by the linear laser beam 422 can also be achieved by means of a compact driving mechanism, the meter device can be used reasonably with a storage device for the vehicle.

Figure 14:
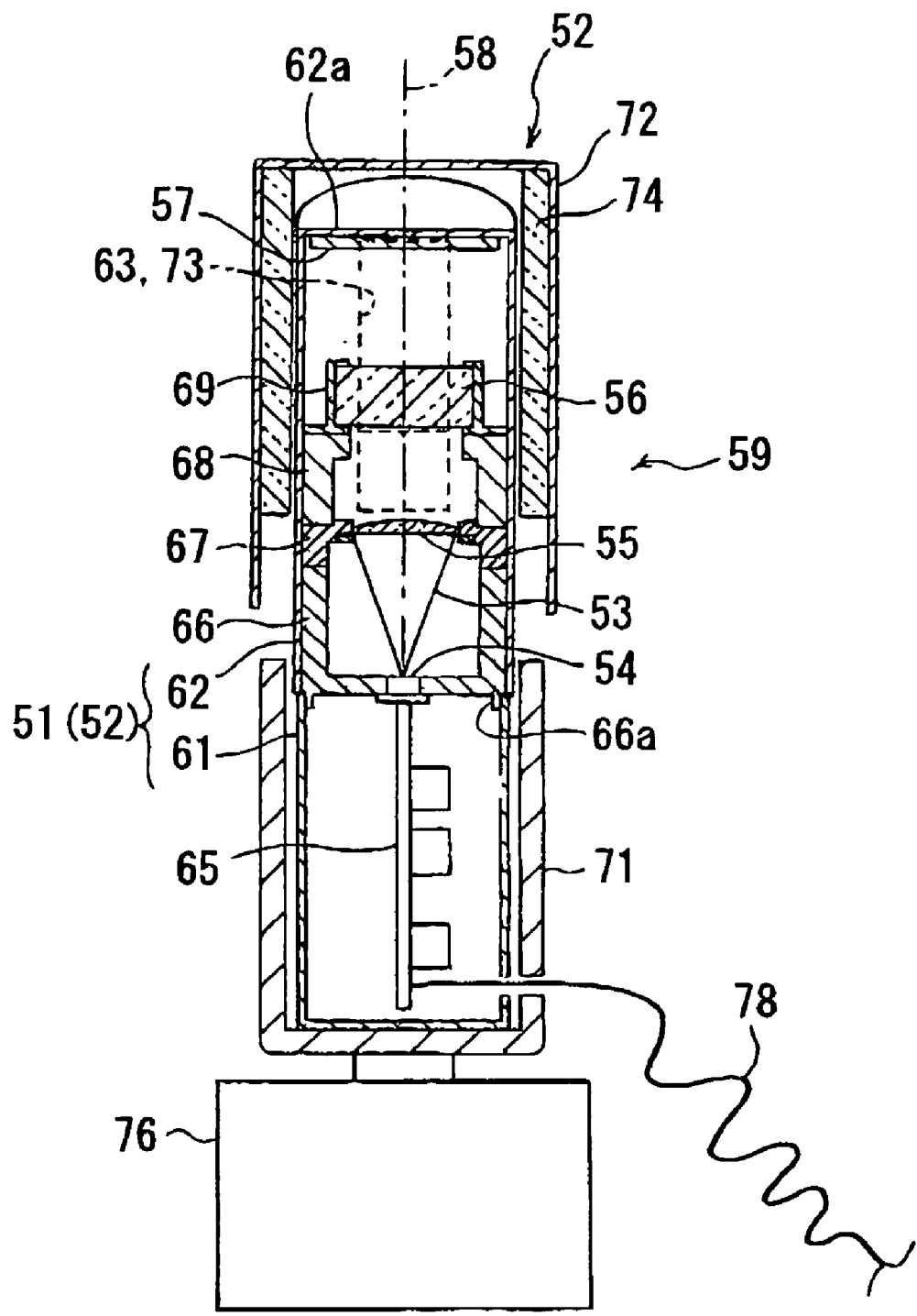
FIG. 14 is a sectional side view showing the meter-displaying device in a position in which a phase is different by 90 degree from the position shown in FIG. 13.
Figure 15:
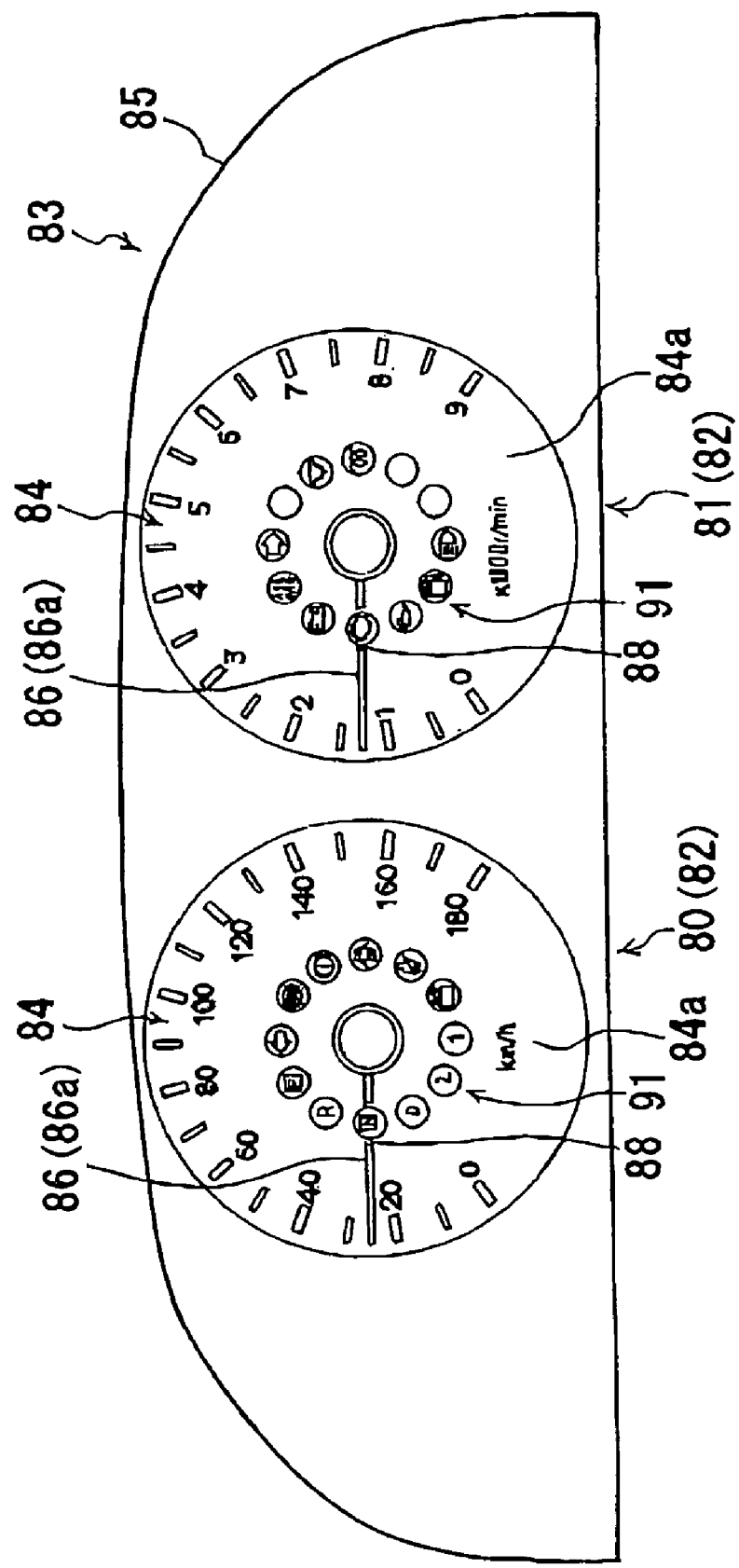
FIG. 15 is a plan view showing a meter-displaying device in a display unit for a vehicle to accomplish a third object of the present invention.

In the above, it should be noted that the light source structure including the laser source, the optical device and so on, in each of the embodiments shown in FIGS. 3, 5, 7, 8 and 26 and so on can be replaced by these shown in FIGS. 13 and 14.

Although the preferred embodiments of present invention have been described, the present invention is not limited to the embodiments. Various modifications and changes can be made for the embodiments.

What is claimed is:

1. A display unit for a vehicle, comprising:
a light source;
an optical device to guide light from the light source and form the light from the light source into a light pointer;
a head portion disposed above a meter surface to project the light pointer formed by the optical device on the meter surface from above of the meter surface;
a driving device to rotate the head portion; and
a height adjusting mechanism to adjust a height of the head portion relative to the meter surface to be capable of changing a length of the light pointer while projecting the light pointer.

2. The display unit for a vehicle according to claim 1, wherein
said light source comprises a laser source capable of generating a laser beam.

3. The display unit for a vehicle according to claim 1, wherein
said light source composes a point source capable of generating a laser beam, and
said optical device is adapted to form the laser beam from the point source into a linear light pointer.

4. The display unit for a vehicle according to claim 3; wherein
said optical device includes a cylindrical lens to form the laser beam from the point source into the linear light pointer.

5. The display unit for a vehicle according to claim 1, wherein
said height adjusting mechanism is disposed between the head portion and the driving device.

6. The display unit for a vehicle according to claim 1, wherein said height adjusting mechanism is configured to elevate the head portion with the driving device.

7. The display unit for a vehicle according to claim 1, wherein
the meter surface has a character-scale part provided on an outer peripheral portion of the meter surface; and
an air-blowing opening is provided inside the meter surface.

8. The display unit for a vehicle according to claim 7, wherein the light pointer is formed by a laser beam.

9. The display unit for a vehicle according to claim 1, further comprising:
an instrument panel having a surface; and
a plurality of air-blowing openings provided in said surface of the instrument panel;
wherein the display unit is provided on the instrument panel.

10. The display unit for a vehicle according to claim 9, wherein
said instrument panel is structured by an instrument panel body and a surface cover attached to a surface of the instrument panel body and having a header space, the surface cover being structured by a madreporite.

11. The display unit for a vehicle according to claim 10, wherein the display unit is attached to the surface cover, and a character-scale area is formed on the surface cover.

12. The display unit for a vehicle according to claim 9, wherein the light pointer is formed by a laser beam.

13. A display unit for a vehicle, comprising:
a laser source as a point source capable of generating a laser beam;
an aspheric lens to focus the laser beam from the laser source;
a conversion lens to convert linearly the laser beam focused by the aspheric lens; and
a mirror to change a direction of the laser beam linearly converted by the conversion lens and to project it on a meter surface,
the laser source, the aspheric lens, the conversion lens, and the mirror being arranged in a straight line and contained in a casing to form a shaft for a light pointer, which is disposed passing through the meter surface to rotate relative to the meter surface.

14. The display unit for a vehicle according to claim 13, wherein said conversion lens comprises a cylindrical lens.

15. A display unit for a vehicle, comprising
a light source;
an optical device to guide light from the light source and form the light from the light source into a light pointer;
a head portion disposed above a meter surface to project the light pointer formed by the optical device on the meter surface from above of the meter surface;
a driving device to rotate the head portion; and
a mechanism for forming a discontinuous part on the light pointer.

16. The display unit for a vehicle according to claim 15, wherein
said mechanism for forming the discontinuous part includes a mask provided on the head portion.

17. The display unit for a vehicle according to claim 15, wherein
an indicator displaying part is provided in a pointer rotating area in the meter surface and the indicator displaying part is disposed on a position at which the light pointer passes the discontinuous part.

18. A storage device for a vehicle, comprising:
a body of the storage device; and
a display unit for the vehicle provided on a surface of the body,
said display unit for the vehicle including a light source,
an optical device to guide light from the light source and form the light from the light source into a light pointer,
a head portion disposed above a meter surface to project the light pointer formed by the optical device on the meter surface from above the meter surface,
a driving device to rotate the head portion,
a height adjusting mechanism to adjust a height of the head portion relative to the meter surface to be capable of changing a length of the light pointer while projecting the light pointer.

19. The storage device according to claim 18, wherein said body of the storage device comprises an upper glove box provided on an upper portion of an instrument panel.

20. The storage device according to claim 19, wherein said upper glove box has a generally cylindrical surface portion whose axis is directed to substantially a direction of vehicle width, and an incoming and outgoing opening is provided in the cylindrical surface portion of the upper glove box, the upper glove box being rotatably attached to the instrument panel to conceal the incoming and outgoing opening in the instrument panel, the display unit being attached to the cylindrical surface portion of the instrument panel to expose on a surface of the instrument panel when the incoming and outgoing opening is concealed in the instrument panel.

* * * * *